(12) United States Patent
Sfarti

(10) Patent No.: US 7,295,204 B2
(45) Date of Patent: Nov. 13, 2007

(54) RAPID ZIPPERING FOR REAL TIME TESSELATION OF BICUBIC SURFACES

(76) Inventor: Adrian Sfarti, 20035 Northwind Sq., Cupertino, CA (US) 95014

( * ) Notice: Subject to any disclaimer, the term of this patent is extended or adjusted under 35 U.S.C. 154(b) by 338 days.

(21) Appl. No.: 11/013,039

(22) Filed: Dec. 14, 2004

(65) Prior Publication Data

US 2006/0125824 A1    Jun. 15, 2006

(51) Int. Cl.
*G06T 17/20* (2006.01)
(52) U.S. Cl. ...................................................... 345/423
(58) Field of Classification Search ................ None
See application file for complete search history.

(56) References Cited

U.S. PATENT DOCUMENTS

| | | | | |
|---|---|---|---|---|
| 5,261,029 | A * | 11/1993 | Abi-Ezzi et al. | 345/423 |
| 5,377,320 | A * | 12/1994 | Abi-Ezzi et al. | 345/423 |
| 5,903,273 | A * | 5/1999 | Mochizuki et al. | 345/423 |
| 6,563,501 | B2 * | 5/2003 | Sfarti | 345/423 |
| 6,597,356 | B1 * | 7/2003 | Moreton et al. | 345/423 |
| 6,600,488 | B1 * | 7/2003 | Moreton et al. | 345/423 |
| 6,906,716 | B2 * | 6/2005 | Moreton et al. | 345/423 |
| 2004/0113909 | A1 * | 6/2004 | Fenney et al. | 345/419 |
| 2004/0227755 | A1 | 11/2004 | Sfarti | |
| 2005/0057568 | A1 | 3/2005 | Sfarti | |

OTHER PUBLICATIONS

Jeffrey M. Lane, Loren C. Carpenter, Turner Whitted, James F. Blinn, "Scan Line Methods for Displaying Parametrically Defined Surfaces," Jan. 1980, Communications of the ACM, vol. 23, No. 1, p. 23-34.*

Xuejun Sheng, Ingo R. Meier, "Generating Topological Structures for Surface Models," Nov. 1995, IEEE Computer Graphics and Applications, vol. 15, No. 6, p. 35-41.*

Jatin Chhugani, Subodh Kumar, "View-Dependent Adaptive Tessellation of Spline Surfaces," Mar. 2001, Proceedings Of The 2001 Symposium On Interactive 3D Graphics, p. 59-62.*

P. V. Sander, Z. J. Wood, S. J. Gortler, J. Snyder, and H. Hoppe, "Multi-chart Geometry Images," Jun. 2003, Proceedings of the 2003 Eurographics Symposium on Geometry Processing, p. 146-155.*

\* cited by examiner

*Primary Examiner*—Ulka Chauhan
*Assistant Examiner*—Jason M Repko
(74) *Attorney, Agent, or Firm*—Strategic Patent Group, P.C.

(57) ABSTRACT

A method and system is provided for rendering bicubic surfaces of an object on a computer system. Each bicubic surface is defined by sixteen control points and bounded by four boundary curves, each corresponding to an edge, and each boundary curve is formed by boundary box of line segments formed between four of the control points. The method and system of include transforming only the control points of the surface given a view of the object, rather than points across the entire bicubic surface, and using the four boundary edges for purposes of subdivision. Next, a pair of orthogonal boundary curves to process is selected. After the boundary curves have been selected, each of the curves is iteratively subdivided and the pair of orthogonal internal curves, wherein two new curves are generated with each subdivision. The subdivision of each of the curves is terminated when the curves satisfy a flatness threshold expressed in screen coordinates, whereby the number of computations required to render the object is minimized.

49 Claims, 22 Drawing Sheets

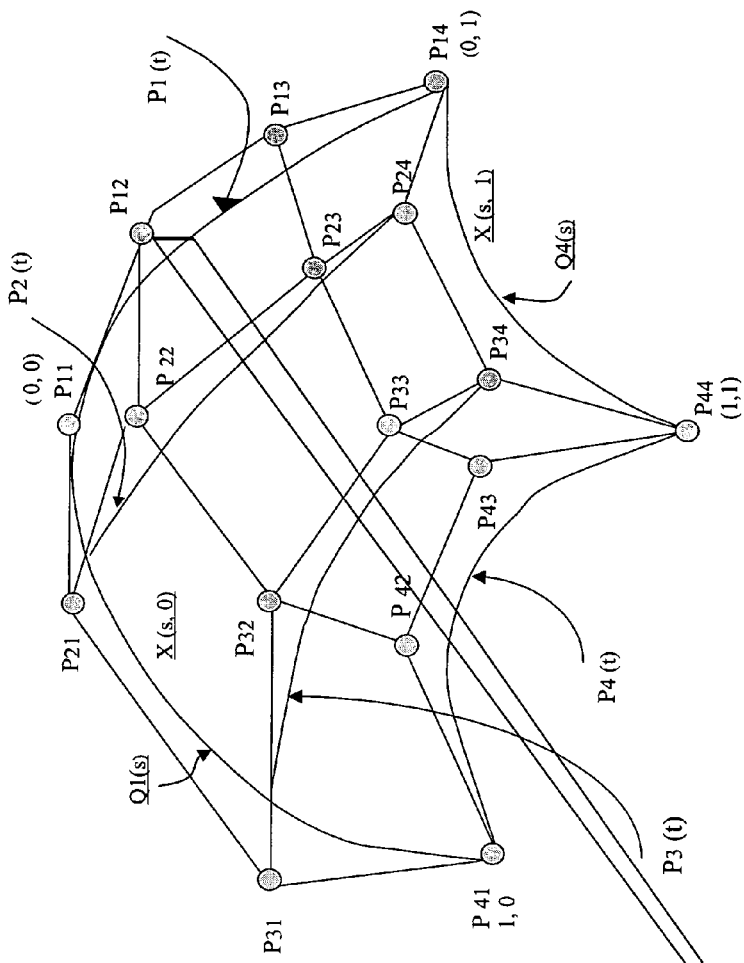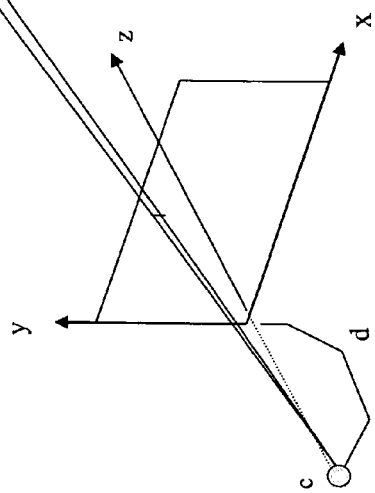
Figure 8

RAPID ZIPPERING FOR REAL TIME TESSELATION OF BICUBIC SURFACES

FIELD OF THE INVENTION

The present invention relates to computer graphics and more specifically to a method and apparatus for rendering a bicubic surface on a computer system in a way that eliminates any possibility of cracks between abutting surfaces.

BACKGROUND OF THE INVENTION

Object models are often stored in computer systems in the form of surfaces. The process of displaying the object (corresponding to the object model) generally requires rendering, which usually refers to mapping the object model onto a two dimensional surface. At least when the surfaces are curved, the surfaces are generally subdivided or decomposed into triangles in the process of rendering the images.

A cubic parametric curve is defined by the positions and tangents at the curve's end points. A Bezier curve, for example, is defined by a geometry matrix of four points (P1-P4) that are defined by the intersections of the tangent vectors at the end points of the curve. Changing the locations of the points changes the shape of the curve.

Cubic curves may be generalized to bicubic surfaces by defining cubic equations of two parameters, s and t. In other words, bicubic surfaces are defined as parametric surfaces where the (x,y,z) coordinates in a space called "world coordinates" (WC) of each point of the surface are functions of s and t. Varying both parameters from 0 to 1 defines all points on a surface patch. If one parameter is assigned a constant value and the other parameters vary from 0 to 1, the result is a cubic curve, defined by a geometry matrix P comprising 16 control points (FIG. 4).

While the parameters s and t describe a closed unidimensional interval (typically the interval [0,1]) the points (x,y,z) describe the surface:

$$x=f(s,t), \ y=g(s,t), \ z=h(s,t) \ s\epsilon[0,1], \ t\epsilon[0,1],$$

where $\epsilon$ represents an interval between the two coordinates in the parenthesis.

The space determined by s and t, the bidimensional interval [0,1]×[0,1] is called "parameter coordinates" (PC). Textures described in a space called "texture coordinates" (TC) that can be two or even three dimensional are described by sets of points of two ((u,v)) or three coordinates ((u,v,q)). The process of attaching a texture to a surface is called "texture-object association" and consists of associating u, v and q with the parameters s and t via some function:

$$u=a(s,t) \ v=b(s,t) \ (\text{and} \ q=c(s,t))$$

Textures can be used in order to apply both color to the objects and also to make the surfaces of the objects to appear rough. In the latter case, when the textures perturb the points on the surface they are called "displacement maps" and when the textures are used to perturb the orientation of the normals to the surface they are called "bump maps". We will show how the present invention applies to both displacement and bump maps.

FIGS. 1A and 1B are diagrams illustrating a process for rendering bicubic surfaces. As shown in FIG. 1A, the principle used for rendering such a curved surface 10 is to subdivide it into smaller four sided surfaces or tiles 12 by subdividing the intervals that define the parameters s and t. The subdivision continues until the surfaces resulting from subdivision have a curvature, measured in WC space, that is below a predetermined threshold. The subdivision of the intervals defining s and t produces a set of numbers {si} i=1,n and {tj} j=1,m that determine a subdivision of the PC. This subdivision induces a subdivision of the TC, for each pair (si,tj) we obtain a pair (ui,j,vi,j) (or a triplet (ui,j,vi,j, qi,j)). Here ui,j=a(si,tj), vi,j=b(si,tj), qi,j=c(si,tj). For each pair (si,tj) we also obtain a point (called "vertex") in WC, Vi,j (x(si,tj),y(si,tj),z(si,tj)).

The contents of a texture map at location (ui,j,vi,j) are color and transparency. The contents of a bump map at a location (mi,j=m(si,tj), ni,j=n(si,tj)) are the components of a three dimensional vector dNi,j used for perturbing the normal Ni,j to the point Vi,j (x(si,tj),y(si,tj),z(si,tj)): N'i,j=Ni,j+dNi,j.

The contents of a displacement map at a location (ki,j=k(si,tj), li,j=l(si,tj)) are the components of a three dimensional point (dxi,j, dyi,j, dzi,j) used for perturbing the coordinates of the the point Vi,j (x(si,tj),y(si,tj),z(si,tj)):

$$V'i,j(x(si,tj),y(si,tj),z(si,tj))=Vi,j(x(si,tj),y(si,tj), z(si,tj)+ (dxi,j, \ dyi,j \ dzi,j)*Ni,j$$

This process is executed off-line because the subdivision of the surfaces and the measurement of the resulting curvature are very time consuming. As shown in FIG. 1B when all resulting four sided surfaces (tiles) 12 are below a certain curvature threshold, each such resultant four-sided surface 12 is then divided into two triangles 14 (because they are easily rendered by dedicated hardware) and each triangle surface gets the normal to its surface calculated and each triangle vertex also gets its normal calculated. The normals are used later on for lighting calculations.

As shown in FIG. 2, bicubic surfaces 10A and 10B that share boundaries must share the same subdivision along the common boundary (i.e., the tile 12 boundaries match). This is due to the fact that the triangles resulting from subdivision must share the same vertices along the common surface boundary, otherwise cracks will appear between them.

The conventional process for subdividing a set of bicubic surfaces in pseudocode is as follows:

Step 1.
  For each bicubic surface
  Subdivide the s interval
  Subdivide the t interval
  Until each resultant four sided surface is below a certain predetermined curvature range Step 2
  For all bicubic surfaces sharing a same parameter (either s or t) boundary
  Choose as the common subdivision the reunion of the subdivisions in order to prevent cracks showing along the common boundary Step 3
  For each bicubic surface
  For each pair (si,tj)
  Calculate (ui,j v,j qi,j Vi,j)
Generate triangles by connecting neighboring vertices Step 4
For each vertex Vi,j
Calculate the normal Ni,j to that vertex
For each triangle
Calculate the normal to the triangle The steps 1 through 4 are executed on general purpose computers and may take up to several hours to execute. The steps of rendering the set of bicubic surfaces that have been decomposed into triangles are as follows:

Step 5.
   Transform the verices Vi,j and the normals Ni,j
   Transform the normals to the triangles
Step 6.
   For each vertex Vi,j
   Calculate lighting
Step 7
   For each triangle
Clip against the viewing viewport
Calculate lighting for the vertices produced by clipping
Step 8
   Project all the vertices Vi,j into screen coordinates (SC)
Step 9
   Render all the triangles produced after clipping and projection Steps 5 through 9 are typically executed in real time with the assistance of specialized hardware found in 3D graphics controllers.

The conventional process for rendering bicubic surfaces has several disadvantages. For example, the process is slow because the subdivision is so computationally intensive, and is therefore often executed off-line. In addition, as the subdivision of the tiles into triangles is done off-line, the partition is fixed, it may not account for the fact that more triangles are needed when the surface is closer to the viewer versus fewer triangles being needed when the surface is farther away. The process of adaptively subdividing a surface as a function of distance is called "automatic level of detail".

Furthermore, each vertex or triangle plane normal needs to be transformed when the surface is transformed in response to a change of view of the surface, a computationally intensive process that may need dedicated hardware. Also, there is no accounting for the fact that the surfaces are actually rendered in a space called "screen coordinates" (SC) after a process called "projection" which distorts such surfaces to the point where we need to take into consideration the curvature in SC, not in WC.

Because the steps required for surface subdivision are so slow and limited, a method is needed for rendering a curved surface that minimizes the number of required computations, such that the images can potentially be rendered in real-time (as opposed to off-line). The present invention addresses such a need.

SUMMARY OF THE INVENTION

The present invention provides a method and system for rendering bicubic surfaces of an object on a computer system. Each bicubic surface is defined by sixteen control points and bounded by four boundary curves, each corresponding to an edge, and each boundary curve is formed by boundary box of line segments formed between four of the control points. The method and system of include transforming only the control points of the surface given a view of the object, rather than points across the entire bicubic surface, and using the four boundary edges for purposes of subdivision. Next, a pair of orthogonal boundary curves to process is selected. After the boundary curves have been selected, each of the curves and the pair of orthogonal internal curves are iteratively subdivided, wherein two new curves are generated with each subdivision. The subdivision of each of the curves is terminated when the curves satisfy a flatness threshold expressed in screen coordinates, whereby the number of computations required to render the object is minimized.

According to the system and method disclosed herein, the number of computations required for rendering of an object model are minimized by requiring that only two orthogonal curves of the surface be subdivided. As the number of computations are decreased, the entire rendering process can potentially be performed in real time. According to another aspect of the present invention, the computations for subdivision are performed by expressing the criteria of terminating the subdivision in the screen coordinates (SC). As the curvature is estimated based on how flat it appears to be in SC (pixels), rather than how curved it is in WC, the number of computations required may further be minimized. As a result, the possibility of rendering images in real time is further enhanced. In addition, allowing the curvature to be measured in SC units also allows for accommodating the distance to the viewer, thus giving the process an "automatic level of detail" capability.

If there are no special prevention methods, cracks may appear at the boundary between abutting surfaces. This is mainly due to the fact that the surfaces are subdivided independently of each other. Abutting surfaces can exhibit different curvatures resulting in different subdivisions.

If two surfaces bounding two separate surfaces share an edge curve, they share the same control points and they will share the same tesselation. By doing so we ensure the absence of cracks between surfaces that belong to data structures that have been dispatched independently.

"Zippering" is an aspect of the present invention that leaves the interior of surfaces untouched, allowing the interior regions to be tessellated without concern for neighboring surfaces. In order to eliminate cracks between adjacent surfaces, the portion of the two surfaces that are in immediate contact with a shared edge curve, called a strip, is tessellated identically on both sides of the edge curve, hence the name of the invention. The principle of the zippering method is described in the following pseudo-code:

For each surface
   Subdivide ALL 4 boundary edges PLUS 2 internal orthogonal curves
   For each of the 4 BOUNDARY EDGES
   Leave a STRIP of 1 subdivision step between the boundary edge and the interior
   For each STRIP
     Zipper the STRIP WITHIN the subdivision parametric steps
   For each of the 4 CORNERS
     Tesselate the AREA not covered by the two STRIPS joining at the CORNER
   Tesselate the INTERIOR PARAMETRIC RECTANGLE

BRIEF DESCRIPTION OF THE DRAWINGS

The present invention will be described with reference to the accompanying drawings, wherein:

FIG. 8 is diagram illustrating an implementation in accordance with the present invention;

DETAILED DESCRIPTION OF THE PREFERRED EMBODIMENTS

The present invention is directed to a method and apparatus for minimizing the number of computations required for the subdivision of bicubic surfaces into triangles. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

According to the present invention, the reduction in computations is attained by reducing the subdivision to the subdivision on only two orthogonal curves. In addition, the criteria for sub-division may be determined in SC. The description is provided with reference to Bezier surfaces for illustration. Due to such features, the present invention may enable objects to be subdivided and rendered in real-time. The partition into triangles may also be adapted to the distance between the surface and the viewer resulting in an optimal number of triangles. As a result, the effect of automatic level of detail may be obtained, whereby the number of resulting triangles is inversely proportional with the distance between the surface and the viewer. The normals to the resulting tiles are also generated in real time by using the cross product of the vectors that form the edges of the tiles. The texture coordinates associated with the vertices of the resulting triangles are computed in real time by evaluating the functions: u=a(s,t) v=b(s,t). The whole process is directly influenced by the distance between viewer and object, the SC space plays a major role in the computations.

If there are no special prevention methods, cracks may appear at the boundary between abutting surfaces. This is mainly due to the fact that the surfaces are subdivided independently of each other. Abutting surfaces can exhibit different curvatures resulting in different subdivisions.

If two surfaces bounding two separate surfaces share an edge curve, they share the same control points and they will share the same tesselation. By doing so we ensure the absence of cracks between surfaces that belong to data structures that have been dispatched independently.

Figure 12:
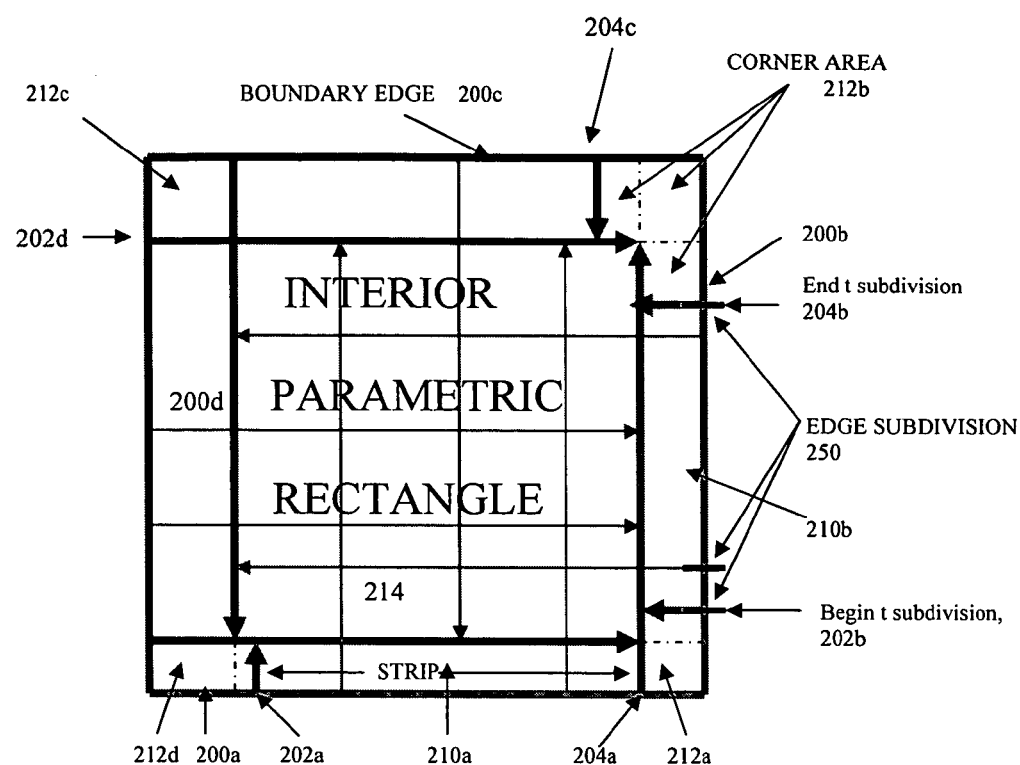
FIG. 12 shows the definitions of the terms used in the zippering invention.

Referring to FIG. 12, each surface to be subdivided is bounded by four edge curves. Each edge is divided into an s or a t subdivision. Each of the s and t subdivisions have a beginning and an end. The area between a boundary edge, the start and the end of one subdivision (s, for example) and the beginning of the other subdivision (t, in this example) is called a strip. There are 4 strips: 210a-d. The area between the two edges meeting at a corner, the end of one subdivision (t, for example) and the beginning of another subdivision (s, in this example) is called corner area. There are 4 corner areas: 212a-d. The four corner areas 212 plus the four strips 210 form a frame. The area resulting after removing the frame from the surface is called the interior parametric rectangle 214.

Figure 19:
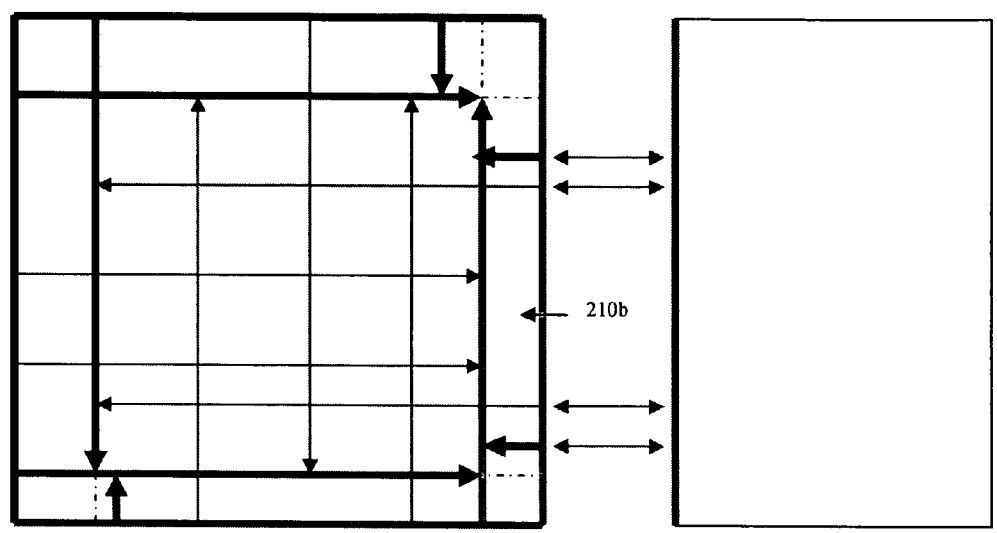
FIG. 19 shows that the method guarantees continuity along abutting edges as well as independent tesselation of neighboring surfaces.

"Zippering" is an aspect of the present invention that leaves the interior of surfaces untouched, allowing the interior regions to be tessellated without concern for neighboring surfaces. In order to eliminate cracks between adjacent surfaces, the portion of the two surfaces that are in immediate contact with a shared edge curve, called a strip, is tessellated identically on both sides of the edge curve. The zippering process is illustrated in FIG. 19. The principle of the zippering method is described in the following pseudo-code:

For each surface
   Subdivide ALL 4 boundary edges PLUS 2 internal orthogonal curves
   For each of the 4 BOUNDARY EDGES
   Leave a STRIP of 1 subdivision step between the boundary edge and the interior
   For each STRIP
      Zipper the STRIP WITHIN the subdivision parametric steps
   For each of the 4 CORNERS
      Tesselate the AREA not covered by the two STRIPS joining at the CORNER
   Tesselate the INTERIOR PARAMETRIC RECTANGLE The present invention is described below in further detail with reference to several examples for illustration. One skilled in the relevant art, however, will readily recognize that the invention can be practiced in other environments without one or more of the specific details, or with other methods, etc. In other instances, well-known structures or operations are not shown in detail to avoid obscuring the invention.

Figure 3:
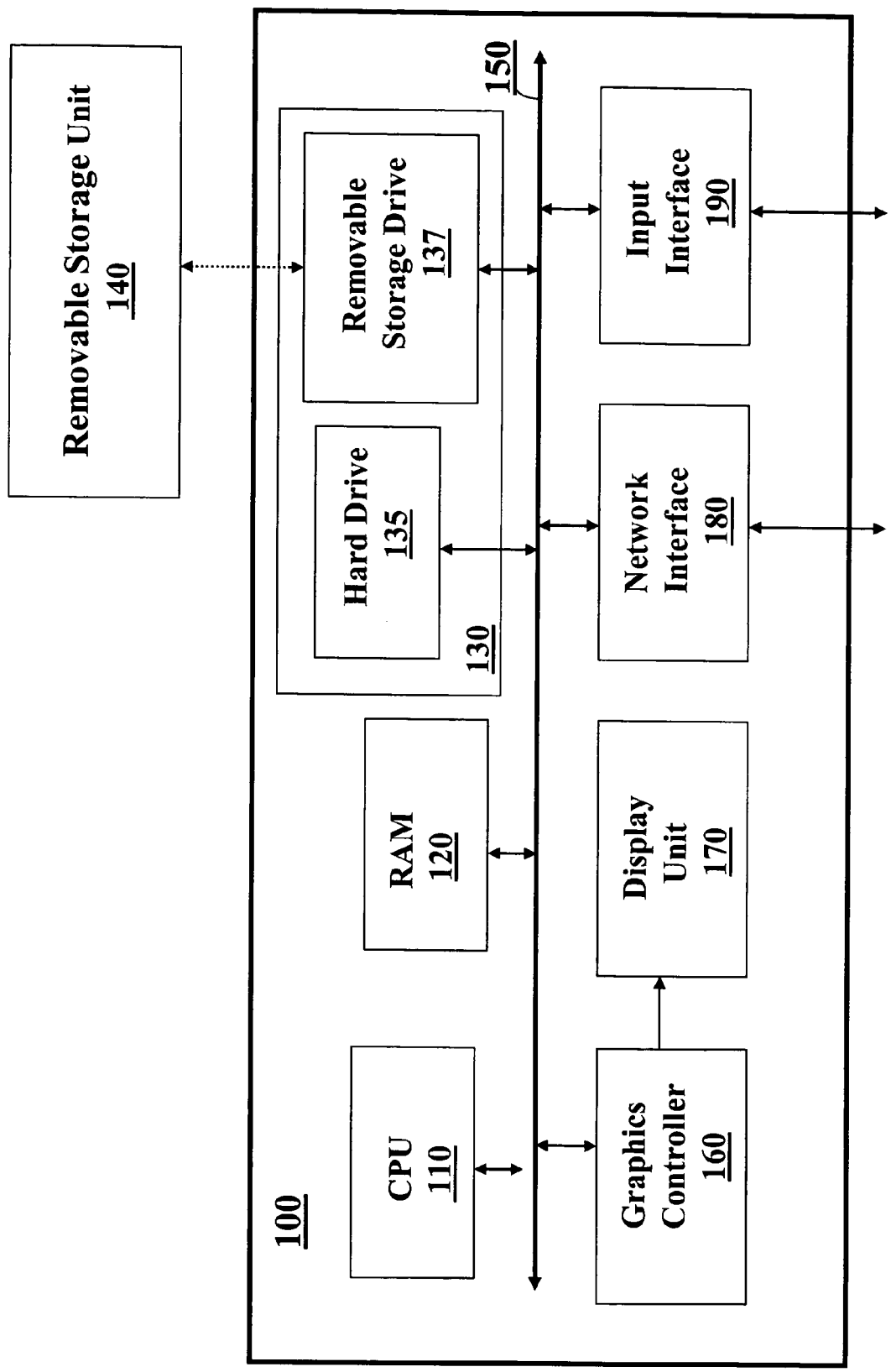
FIG. 3 is a block diagram of a computer system illustrating the details of an embodiment in which the present invention can be implemented.

FIG. 3 is a block diagram of computer system 100 illustrating an example embodiment in which the present invention can be implemented. Computer system 100 may be implemented for example, as a stand-alone computer which displays different images or as a server which renders the images for display on another system connected by the Internet. Even though computer system 100 is described with specific components and architecture for illustration, it should be understood that the present invention may be implemented in several other types of embodiments. For example, the invention can be implemented on multiple cooperating networked computer systems. In addition, each component can be implemented as a combination of one or more of hardware, software and firmware.

Computer system 100 may contain one or more processors such as central processing unit (CPU) 110, random access memory (RAM) 120, secondary storage 130, graphics controller 160, display unit 170, network interface 180, and input interface 190. All the components except display unit 170 may communicate with each other over communication path 150, which may contain several buses as is well known in the relevant arts. The components of FIG. 3 are described below in further detail.

CPU 110 may execute instructions stored in RAM 120 to provide several features of the present invention. RAM 120 may retrieve such instructions from secondary storage 130 using communication path 150. In the alternative, the instructions may be retrieved on network interface 180 from an external server provided, for example, by an application service provider (ASP) or by another division within a same organization. Network interface 180 may be implemented using Internet protocol (IP). Network interface 180 may also provide communication with a client system (not shown) during the target application development process.

Graphics controller 160 may receive commands and data on communication path 150 from CPU 110, and generates display signals (e.g., in RGB format) to display unit 170. The display signals are generated according to the commands and data received on communication path 150. Display unit 170 contains a display screen to display the images defined by the display signals. Input interface 190 may correspond to a key-board and/or mouse, and generally enables a user to provide inputs. CPU 110, RAM 120, graphics controller 160, display unit 170, network interface 180, and input interface 190 may be implemented in a known way.

Secondary memory 130 may contain hard drive 135 and removable storage drive 137. Hard drive 135 may store the software instructions and data, which enable computer system 100 to provide several features in accordance with the present invention. Hard drive 135 may also store data representing curved surfaces of different objects. In the alternative, some or all of the data and instructions may be provided on removable storage unit 140, and the data and instructions may be read and provided by removable storage drive 137 to CPU 110. Floppy drive, magnetic tape drive, CD-ROM drive, DVD Drive, removable memory chip (PCMCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer usable storage medium having stored therein computer software and/or data. An embodiment of the present invention is implemented using software running (that is, executing) in computer system 100. In this document, the term "computer program product" is used to generally refer to removable storage unit 140 or hard disk installed in hard drive 135. These computer program products are means for providing software to computer system 100.

As noted above, computer programs (also called computer control logic) and data representing bicubic surfaces are stored in main memory (RAM 110) and/or secondary storage 130. In the embodiments implemented using software, the software may be stored in a computer program product and loaded into computer system 100 using removable storage drive 137, hard drive 135, or network interface 180. Alternatively, graphics controller 160 (implemented using a combination of hardware, software and/or firmware) may execute the software to provide various features of the present invention.

The control logic (software), when executed by CPU 120 (and/or graphics controller 160) causes CPU 120 (and/or graphics controller 160) to perform the functions of the invention as described herein. In one embodiment, CPU 120 receives the data representing the curved surfaces and instructions, and processes the data to provide various features of the present invention described below. Alternatively, CPU 120 may send control points (described below) to graphics controller 160, which then renders the image.

For simplicity, irrespective of the specific component(s) performing the underlying operation, the operations are described as being performed by computer system 100. The operation and implementation of the components (including software) will be apparent to one skilled in the relevant arts at least based on the description provided below. Several aspects of the present invention are described below with reference to computer system 100 for illustration. The invention permits combining the steps of subdivision and rendering such they are executed together and in real time. The execution of both subdivision and rendering is made possible inside the same graphics controller 160. Alternatively, the subdivision can be executed by the CPU 110 while the rendering is executed by the graphic controller 160.

The steps involved in the combined subdivision and rendering of bicubic surfaces in accordance with the present invention are described below in pseudo code. As will be appreciated by one of ordinary skill in the art, the text between the "/*" and "*/" symbols denote comments explaining the pseudo code.

Step 0. /* For each surface, transform only 16 points instead of transforming all the vertices inside the surface given a particular view. There is no need to transform the normals since they are generated at step 4 */

For each bicubic surface

Transform the 16 control points that determine the surface

Step 1. /* Simplify the three dimensional surface subdivision by reducing it to the subdivision of two dimensional curves */

For each bicubic surface

Subdivide the boundary curve representing s interval until the projection of the height of the curve bounding box is below a certain predetermined number of pixels as measured in screen coordinates (SC)

Subdivide the boundary curve representing t interval until the projection of the height of the curve bounding box is below a certain predetermined number of pixels as measured in screen coordinates (SC)

/*Simplify the subdivision termination criteria by expressing it in screen (SC) coordinates and by measuring the curvature in pixels. For each new view, a new subdivision can be generated, producing automatic level of detail.*/

Step 2 /*Zipper two abutting surfaces such that there are no cracks */
  For each surface
    Subdivide ALL 4 boundary edges PLUS 2 internal orthogonal curves
    For each of the 4 BOUNDARY EDGES
      Leave a STRIP of 1 subdivision step between the boundary edge and the interior
    For each STRIP
      Zipper it WITHIN the subdivision parametric steps
    For each of the 4 CORNERS
      Tesselate the AREA not covered by the two STRIPS joining at the CORNER
      Tesselate the INTERIOR PARAMETRIC RECTANGLE Step 3 /* Generate the vertices, normals and the texture coordinates for the present subdivision */
  For each bicubic surface
    For each pair (si,tj)
    Calculate (ui,j v,j qi,j Vi,j)
      Calculate (mi,j ni,j) coordinates of the bump map
      Calculate (ki,j li,j) of the displacement map
      Generate triangles by connecting neighboring vertices Step 4
  For each vertex Vi,j
    Calculate the normal Ni,j to that vertex
    If there is displacement mapping calculate the displaced vertex: Vi,j (x(si,tj),y(si,tj),z(si,tj))+(dxi,j, dyi,j, dzi,j)*Ni,j
    If there is bump mapping calculate the displaced normal: N'i,j=Ni,j+dNi,j
  For each triangle
    Calculate the normal to the triangle Step 5.
  For each vertex Vi,j
    Calculate lighting Step 6
  For each triangle
    Clip against the viewing viewport
    Calculate lighting for the vertices produced by clipping Step 7.
  Project all the vertices Vi,j into screen coordinates (SC)

Step 8
  Render all the triangles produced after clipping and projection

Figure 4:
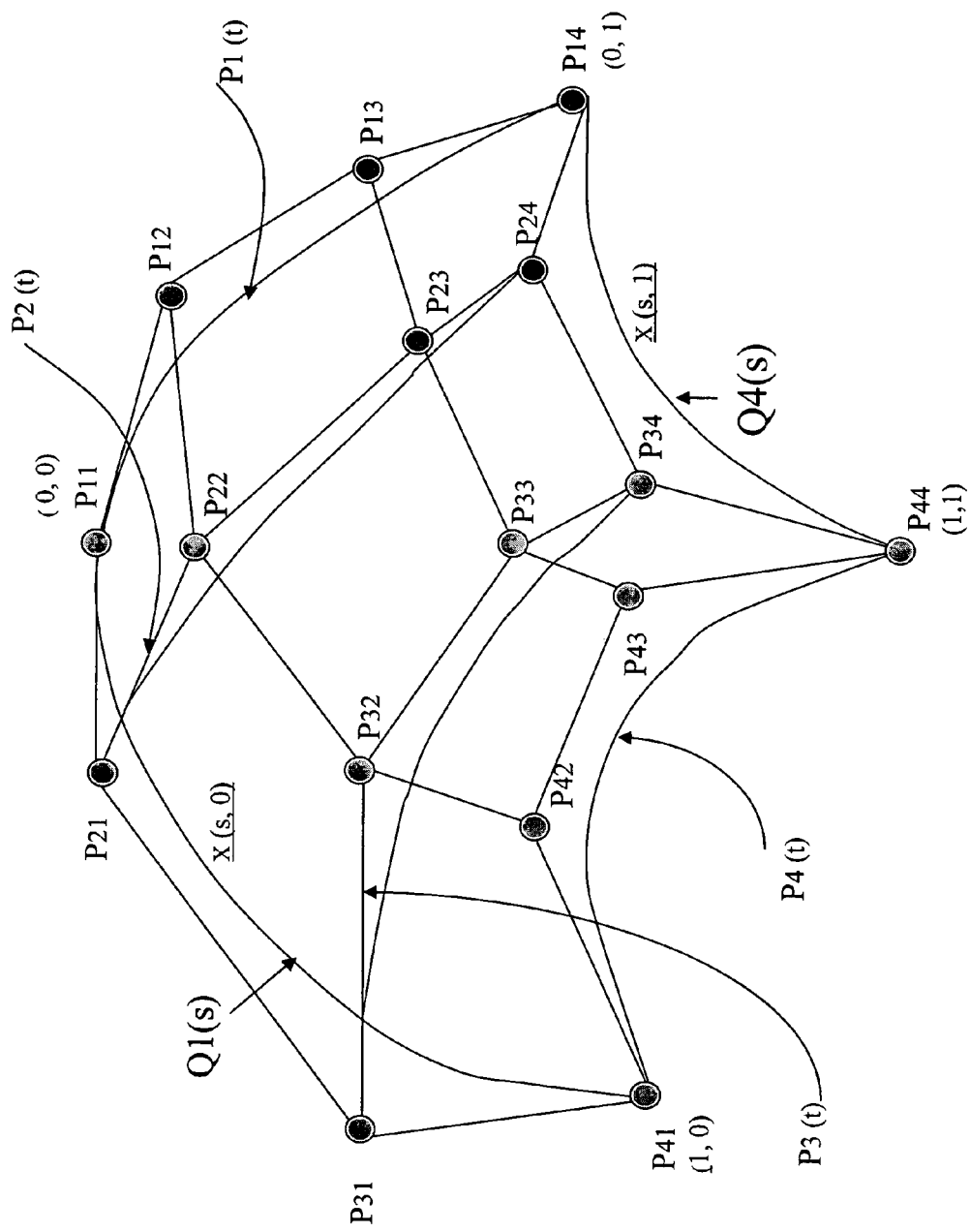
FIG. 4 is a diagram illustrating the theory of Bezier surfaces.

The combined subdivision and rendering process for bicubic surfaces will now be explained in further detail, starting with a description of bezier surfaces. FIG. 4 is a diagram illustrating the theory of Bezier surfaces. Such surfaces are completely determined by 16 control points, P11 through P44. The boundaries of a Bezier surface is defined by four boundary curves, shown in FIG. 4 P1(t), P4 t), Q1(s) and Q4(s), which are all Bezier curves. Each boundary curve is defined by a boundary box formed by the control points that are located above and parallel to the curve. For example, the boundary box for curve P1(t) is formed by line segments drawn between control points P11, P12, P13, and P14. The coordinates of any point on a Bezier surface can be expressed as:

$$x(s, t) = S * Mb * Px * Mb^t * T \text{ wherein}$$

$$S = [s^3 \, s^2 \, s \, 1] \quad T = [t^3 \, t^2 \, t \, 1]^t$$

The superscript $t$ indicates transposition $$Mb = \begin{vmatrix} -1 & +3 & -3 & +1 \\ +3 & -6 & +3 & 0 \\ -3 & +3 & 0 & 0 \\ +1 & 0 & 0 & 0 \end{vmatrix}$$

$Mb^t$ is the transposed of matrix $Mb$ $$Px = \begin{vmatrix} P11 & P12 & P13 & P14 \\ P21 & P22 & P23 & P24 \\ P31 & P32 & P34 & P34 \\ P41 & P42 & P43 & P44 \end{vmatrix}_x$$

$$y(s, t) = S * Mb * Py * Mb^t * T$$

where $$Py = \begin{vmatrix} P11 & P12 & P13 & P14 \\ P21 & P22 & P23 & P24 \\ P31 & P32 & P34 & P34 \\ P41 & P42 & P43 & P44 \end{vmatrix}_y$$

$$z(s, t) = S * Mb * Pz * Mb^t * T$$

Figure 1:
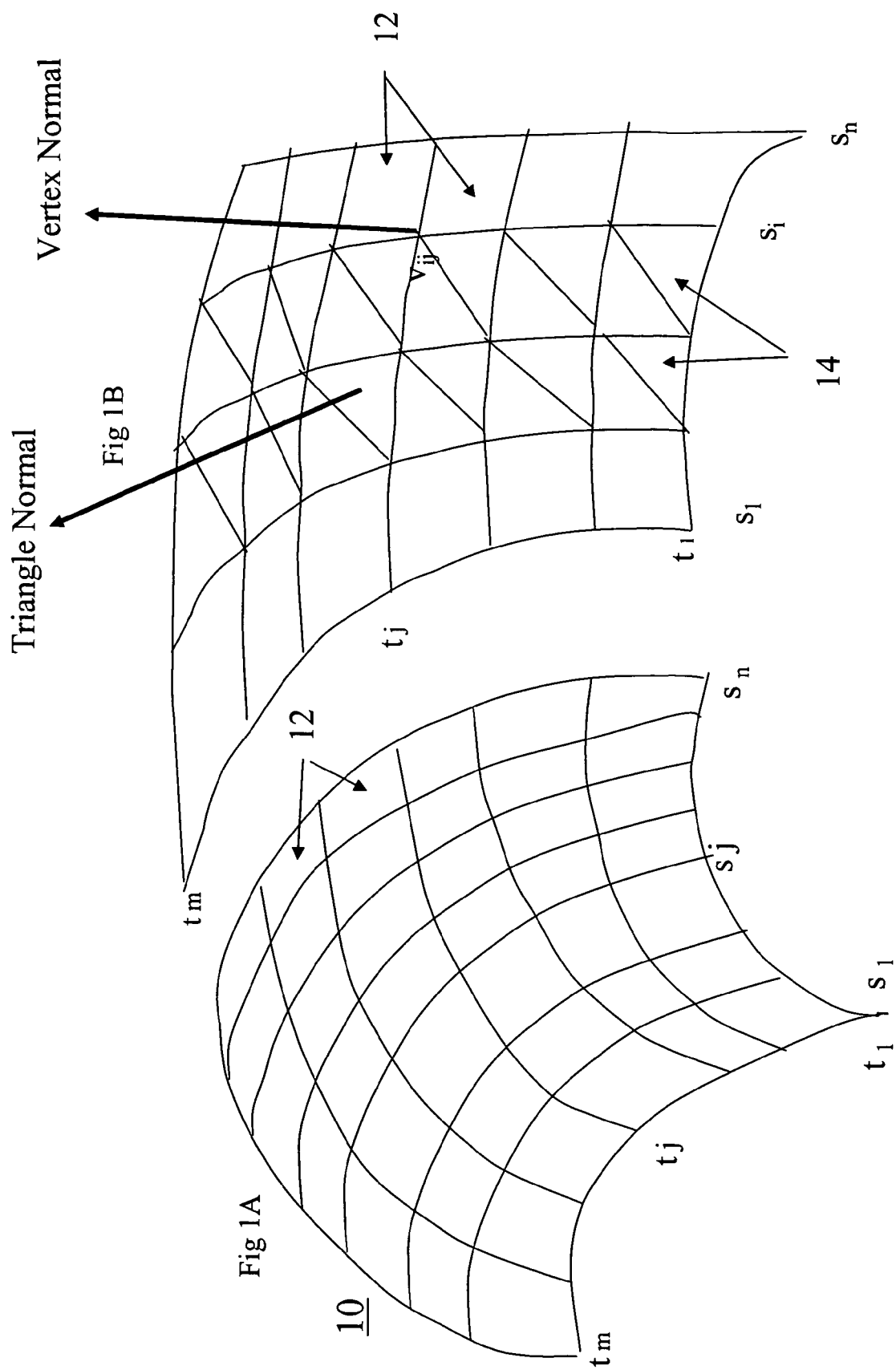
FIGS. 1A and 1B show how bicubic surfaces are subdivided into tiles.
Figure 2:
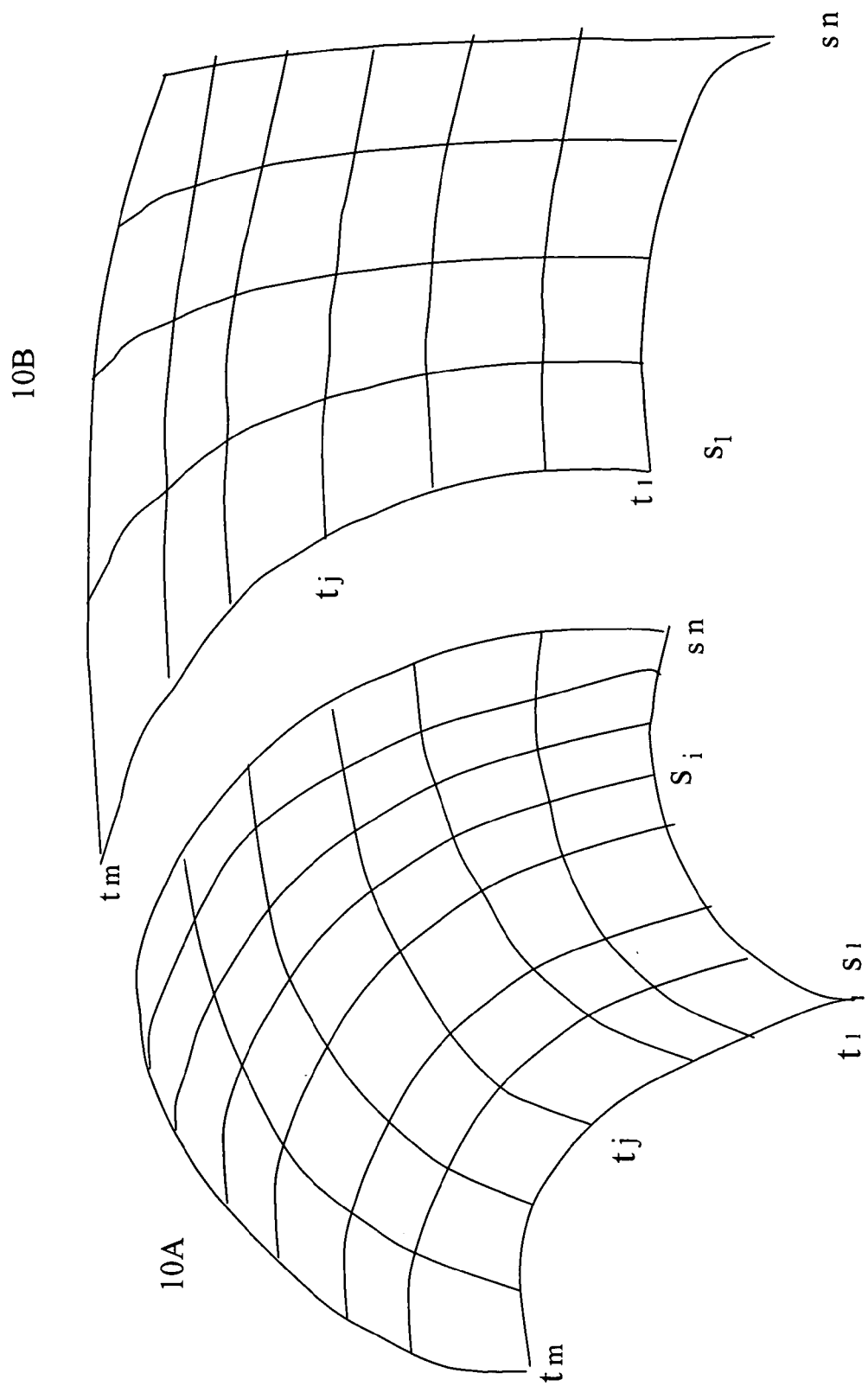
FIG. 2 shows how bicubic surfaces sharing a boundary also share the same subdivision.

When rendering a Bezier surface, the conventional method is to subdivide the surface into smaller four sided tiles, as shown in FIG. 1A, by subdividing the intervals across the entire surface that define the parameters s and t until the subdivision reaches a predetermined threshold.

According to an aspect of the present invention, requiring that only two orthogonal curves of the surface be subdivided minimizes the number of computations required for rendering an object model.

In order to subdivide the surface determined by the sixteen control points P11-P44 we need only to subdivide a pair of orthogonal curves, either the pair {P11, P12, P13, P14} {P14, P24, P34, P44} (i.e. P1(t) and Q4(s)) or the pair {P44, P43, P42, P41} {P41, P31, P21, P11}(i.e., P4(t) and Q1(s)). It may be observed that one of the curves in the pair is a function only of parameter s while the other is a function only of parameter t. The reason this is true is that the curvature of a bicubic surface is a direct function of the curvature of its boundaries. By controlling the curvature of the boundaries, computer 100 controls the curvature of the surface.

Figure 5:
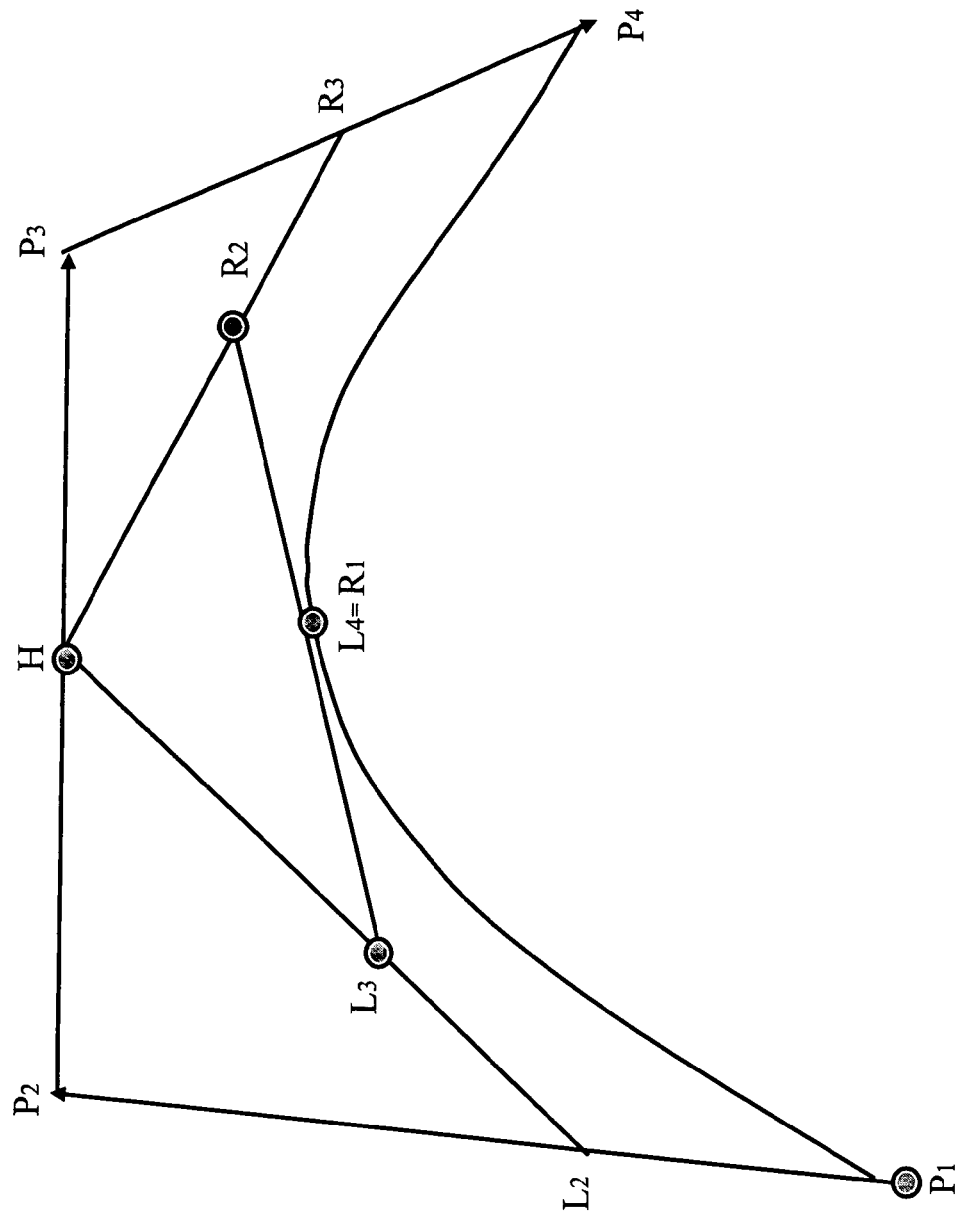
FIG. 5 depicts a graph illustrating an approach by which a Bezier curve may be divided into connected segments of Bezier curves.

FIG. 5 depicts a graph illustrating an approach by which computer system 100 may divide a Bezier curve into connected segments of Bezier curves. The curves formed by the bounding box defining a Bezier curve comprises a plurality of line segments where each segment lies between two control points. The approach uses an iterative process that subdivides the segments that form the bounding box of the curve. At each iteration the Bezier curve is divided into two curve segments, producing two smaller bounding boxes. Each subdivision step halves the parameter interval. The algorithm uses the initial points P1, P2, P3, P4 of the initial boundary box to produce the points:

$L1=P1$ $L2=(P1+P2)/2$ $H=(P2+P3)/2$ $$L3=(L2+H)/2$$

$$R4=P4$$

$$R3=(P3+P4)/2$$

$$R2=(R3+H)/2$$

$$R1=L4=(L3+R2)/2$$

The geometry vectors of the resulting left and right cubic curve segments may be expressed as follows:

$$GL = \begin{vmatrix} L1 \\ L2 \\ L3 \\ L4 \end{vmatrix} = 1/8 * \begin{vmatrix} 8 & 0 & 0 & 0 \\ 4 & 4 & 0 & 0 \\ 2 & 4 & 2 & 0 \\ 1 & 3 & 3 & 1 \end{vmatrix} * \begin{vmatrix} P1 \\ P2 \\ P3 \\ P4 \end{vmatrix} = DL * G$$

$$\text{where } DL = \begin{vmatrix} 8 & 0 & 0 & 0 \\ 4 & 4 & 0 & 0 \\ 2 & 4 & 2 & 0 \\ 1 & 3 & 3 & 1 \end{vmatrix}$$

$$G = \begin{vmatrix} P1 \\ P2 \\ P3 \\ P4 \end{vmatrix}$$

$$GR = \begin{vmatrix} R1 \\ R2 \\ R3 \\ R4 \end{vmatrix} = 1/8 * \begin{vmatrix} 1 & 3 & 3 & 1 \\ 0 & 2 & 4 & 2 \\ 0 & 0 & 4 & 4 \\ 0 & 0 & 0 & 8 \end{vmatrix} * \begin{vmatrix} P1 \\ P2 \\ P3 \\ P4 \end{vmatrix} = DR * G$$

$$\text{where } DR = \begin{vmatrix} 1 & 3 & 3 & 1 \\ 0 & 2 & 4 & 2 \\ 0 & 0 & 4 & 4 \\ 0 & 0 & 0 & 8 \end{vmatrix}$$

Figure 6:
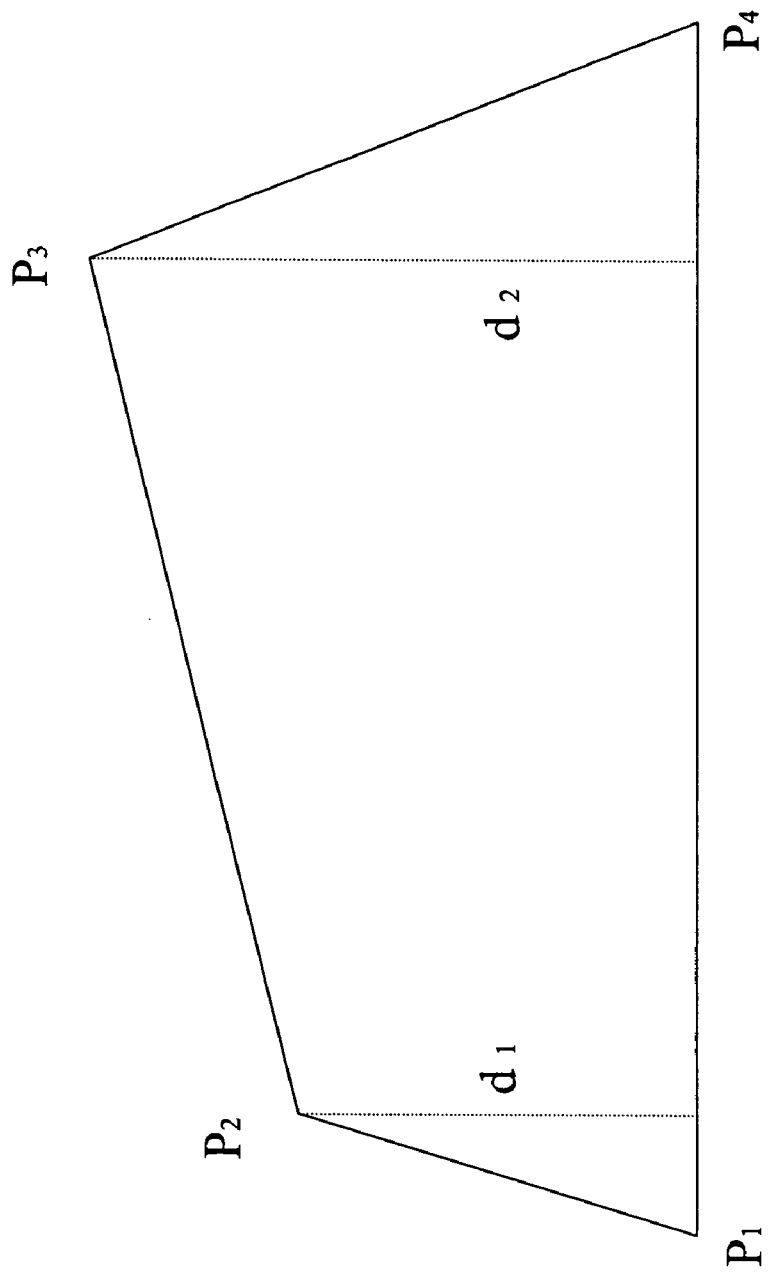
FIG. 6 is a diagram illustrating the criteria of terminating the subdivision (decomposition) of a Bezier curve in the present invention.

FIG. 6 is a diagram illustrating the criteria which computer system 100 may use for terminating the subdivision (decomposition) of the Bezier curve. The subdivision is terminated when a curve reaches a predetermined flatness. After a subdivision, the height of the bounding box in two points is measured. If the maximum height of the bounding box is smaller than a given error term, then a flatness threshold has been met and the curve bounded by the box is no longer subdivided. In one preferred embodiment, SC, computer system 100 is described as expressing the error term to be one pixel.

Max $\{d1, d2\} < 1$ where d1 and d2 are the distances of P2 respectively P3 to the segment P1, P4

Subdividing only a pair of orthogonal curves, greatly speeds up the subdivision because only two curves need to be subdivided instead of the whole surface, which produces a net of orthogonal curves onto the surface. In addition, only the curves need to be checked for flatness instead of the whole surface, thus the subdivision termination criteria is also simplified.

The manner in which a surface may be subdivided is described in further detail with reference to FIGS. 7-9. Computer system 100 may subdivide two of the boundary Bezier curves, P1(t) and Q4(s) for example. Any pair of orthogonal curves may be chosen. The pairs that can be used are: (P1, Q1), (P1, Q4), (P4, Q1) and (P4, Q4). For illustration, it will be assumed that the pair (P1, Q4) is chosen.

The curves P1 and Q4 are subdivided according to the approach described above with reference to FIG. 5. Each subdivision step for P1 and Q4 halves the parameter interval for t and s respectively. Three different subdivision termination criteria are illustrated with reference to FIGS. 7-9.

Figure 7:
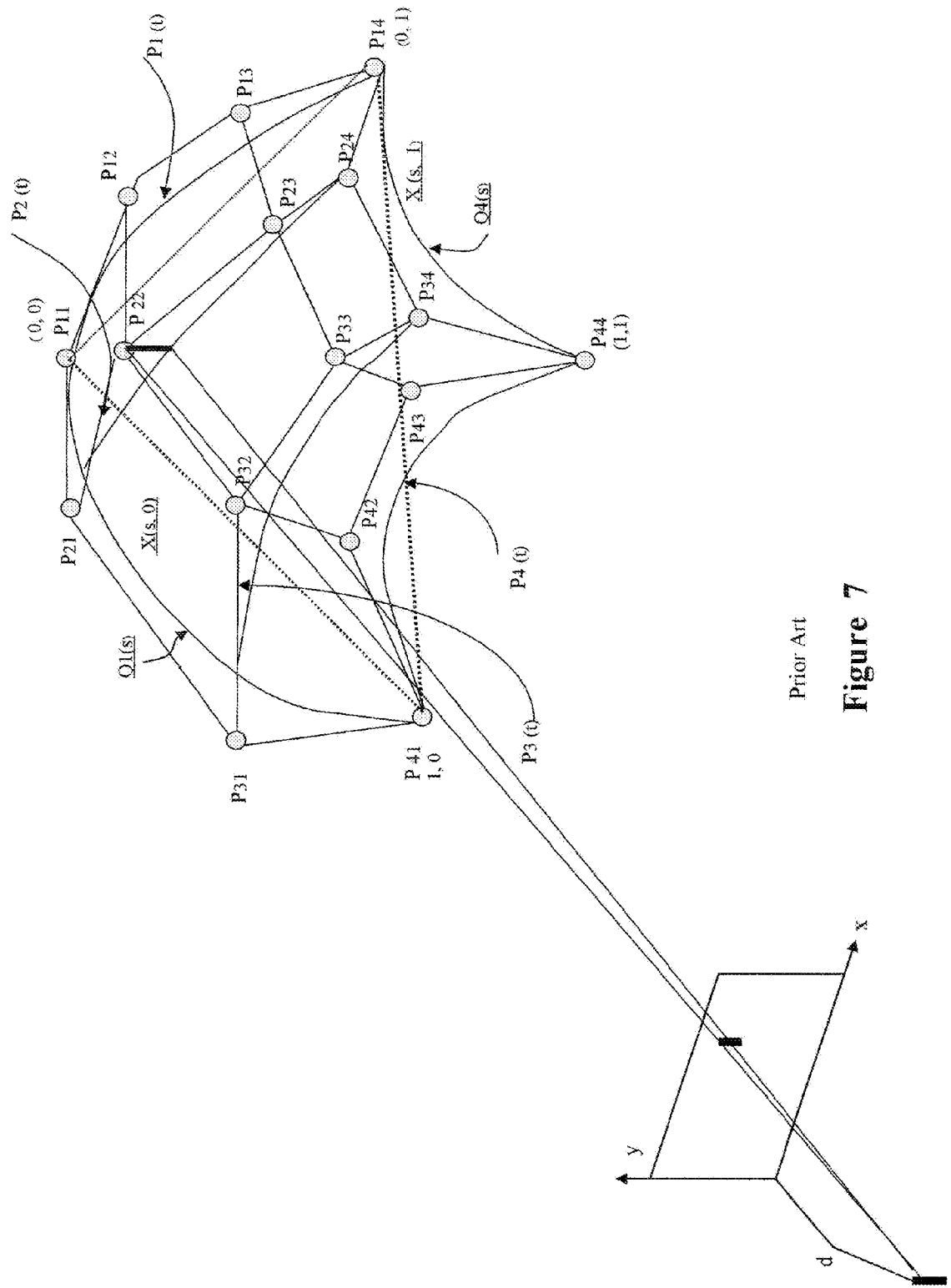
FIG. 7 shows an example of prior art in terms of determining the flatness of the surface.

In FIG. 7 computer system 100 may use the distance from the control point P22 (as is well known these points are referred to as control points because their position determines the position of all the other points on the surface) to the plane determined by points P11, P14, P41 (the termination point of the pair of orthogonal boundary curves) and the distance between the control point P33 to the plane formed by P14, P44, P41 to decide if the surface is within the predetermined criteria of flatness. Each of these distances may be compensated for the distance from the viewer by a projection division by the factors P22z/d and P33z/d respectively where P22z represents the z component of point P22 and P33z is the z component of P33, d is the distance between the center of projection and the screen. Using this compensation allows for expressing the criteria of subdivision termination in terms of pixels, i.e., in SC. The maximum of the two distances compensated for the distance to the viewer needs to be less than a number of pixels (one in our example).

Computer system 100 could have used the pair of control points (P23, P32), computer system 100 could also use groups of three control points (P22, P23, P33) for example or computer system 100 could have used all four control points (P22, P23, P32, P33). Two control points are sufficient in the described embodiments.

FIG. 7 may be used to compare some aspects of the present invention with some prior art embodiments in terms of determining flatness criteria. The distance from one of the internal control points (P22 in the example) to the plane formed by three other control points (P11, P14, P41) is adjusted for the distance to the viewer by multiplication by the factor d/P22z and the result may need to be less than one pixel. The same condition may need to be satisfied for the control point P33:

distance (P22 to plane (P11, P14, P41))*d/P22z<1

AND distance (P33 to plane (P14, P44, P41))*d/P22z<1 means the termination of the subdivision. What may make the algorithm slow is the fact that it involves determining the control points P22 and P33 for each iteration. By contrast, an algorithm implemented according to an aspect of the present invention may make use of the control points of two of the boundary curves only.

In FIG. 8 is shown an implementation by using the distances of the control points P12 and P13 to the line segment (P11, P14), the distance of the control points P24 and P34 to the line segment (P14, P44) compensated for distance to the viewer need to be less than a predetermined number of pixels (one, in our case).

Maximum {distance (P12 to line (P11, P14), distance (P13 to line(P11, P14)}*2d/(P12z+P13z)<1

AND

Maximum {distance (P24 to line (P14, P44), distance (P34 to line(P14, P44)}*2d/(P24z+P34z)<1

Figure 9:
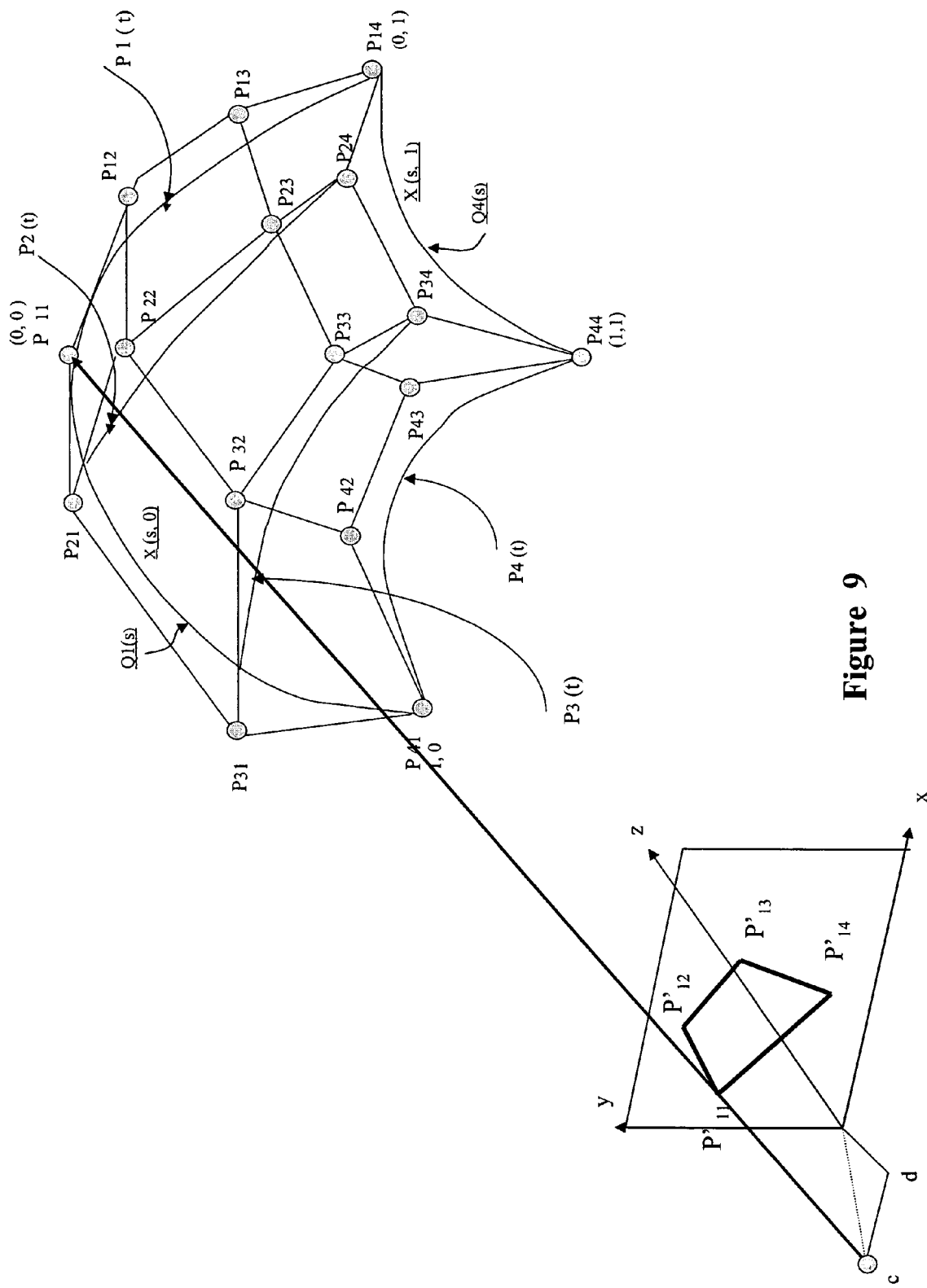
FIG. 9 is a diagram illustrating the criteria for termination of decomposition in an embodiment of the present invention.

FIG. 9 shows an implementation of the termination criteria. Computer system 100 projects the control points and the line segments shown in FIG. 7 onto the screen. Computer system 100 then measures the projected distances. If the distances are less than one pixel, the subdivision is terminated. It may be noted that it does not account for the surface curvature of surfaces oriented parallel to the screen.

Let Pij'=projection on the screen of Pij

Then the criteria for subdivision termination is:

Maximum {distance (P12' to line (P11',P14'), distance (P13☐ to line(P11',P14')}<1

AND

Maximum {distance (P24' to line (P14',P44'), distance (P34' to line (P14',P44')}<1

Figure 10:
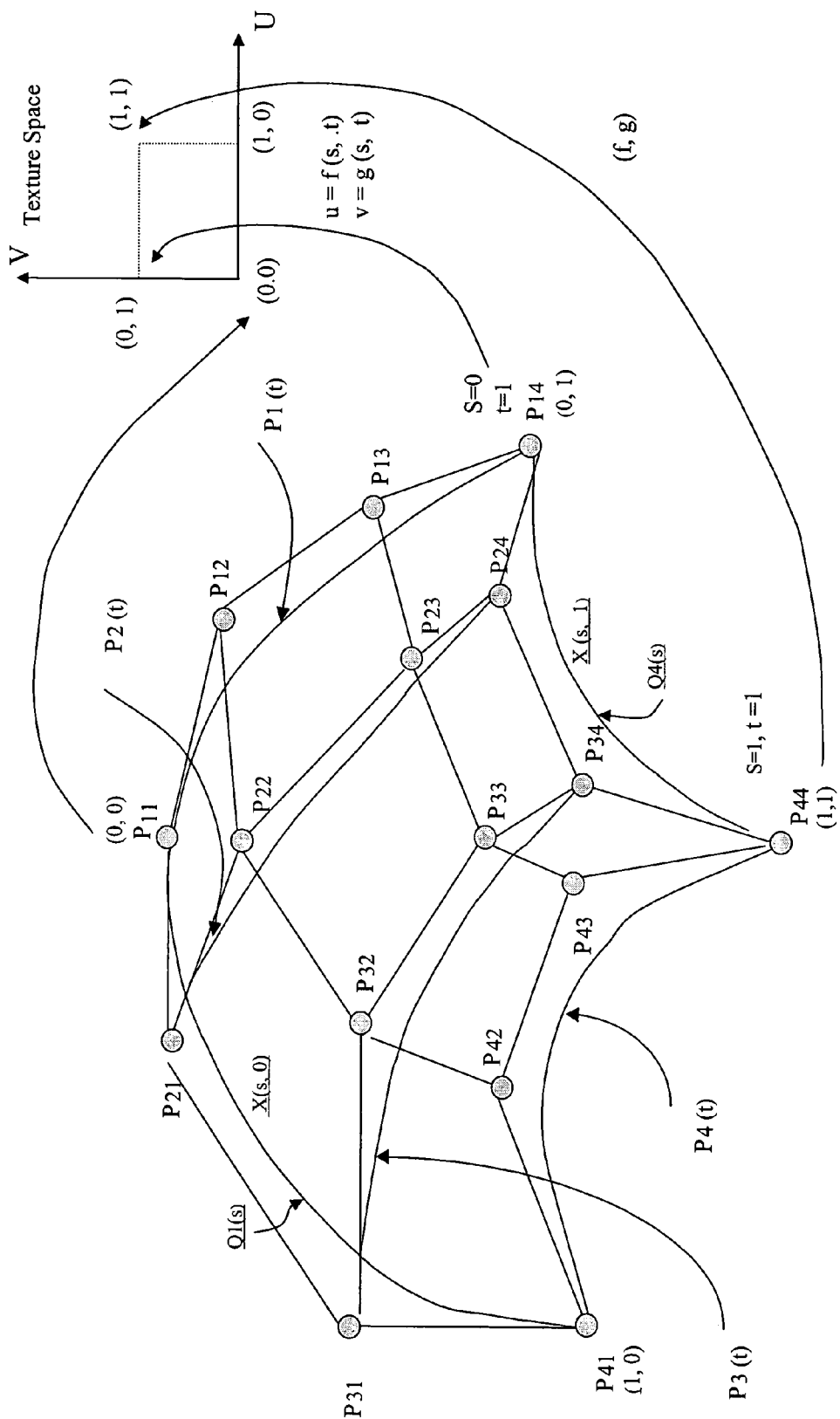
FIG. 10 shows the effect of subdividing the parameter space (s,t) on dividing the texture space (u,v)

FIG. 10 shows the result of the subdivision. The Bezier surface is approximated by two triangles (P11, P14, P44) and (P44, P41, P11). The normal in any vertex can be calculated as the cross-product of the oriented edges that stem from the vertex.

Figure 11:
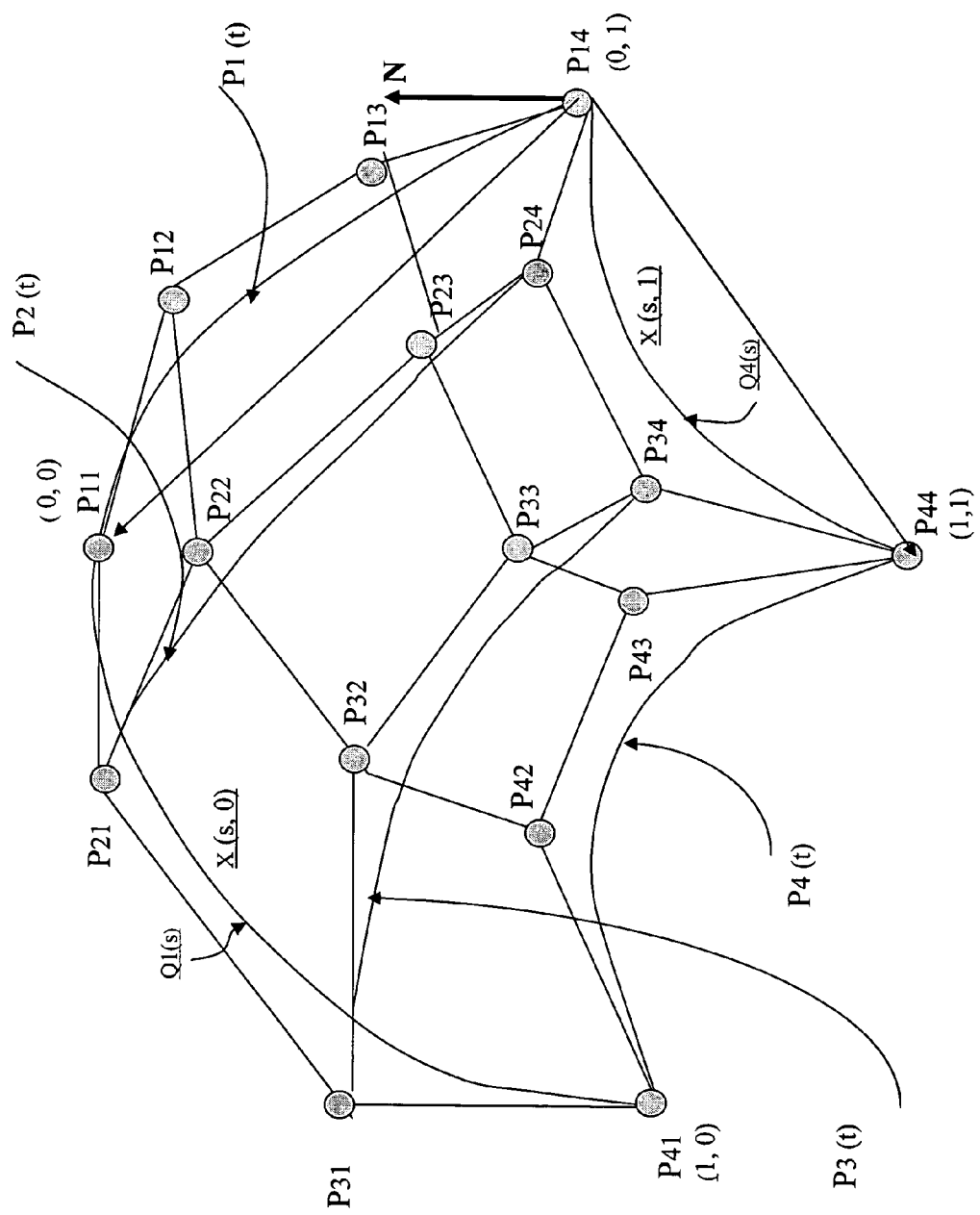
FIG. 11 shows the calculation of the normal N to the vertex as the cross product of the vectors that start in the vertex and connect it with the neighboring vertices.

FIG. 11 shows the effect of subdividing the parameter space (s,t) on dividing the texture space (u,v). For each pair of pair of parameters (s,t) that results from the subdivision, a new pair of parameters (u,v) is obtained by evaluating the functions that express u and v as functions of s and t.

FIG. 11 also shows the calculation of the normal N to the vertex P14. The normal vector N is equal to:

N=(vector(P14P11)×vector(P14P24))/length(vector (P14P11)×vector(P14P24))

B-Spline surfaces can be passed through the same algorithm by knowing that any B-spline curve can be represented as a Bezier curve through a basis change (change of representation). NURBS surfaces (non uniform rational B-splines) or any other form of rational bicubic surface can be subdivided by making use of the existing algorithms for subdividing NURB curves. This algorithm uses a recursive approach in determining the new control points for the bounding boxes by inserting new values named "knots" into the parameter interval. A complete description can be found in "Mathematical Elements for Computer Graphics" By D. F. Rogers, which is incorporated in its entirety into the present application.

Most objects are created from abutting multiple surfaces creating a so-called surface mesh. The subdivision algorithm must produce the same number of steps for each edge shared by two surfaces in the mesh, otherwise cracks will appear along the shared edge between surfaces. Two separate surfaces sharing an edge curve share the same control points and thus will share the same tesselation. By doing so we ensure the absence of cracks between surfaces that belong to data structures that may have been dispatched independently for rendering purposes.

FIG. 12 shows the definitions of the terms used in the zippering invention. Each surface to be subdivided is bounded by four "edges", 200a-d. Referring to FIG. 4 an example of such edges are the curves determined by the control points: $P_{11}P_{12}P_{13}P_{14}$, $P_{14}P_{24}P_{34}P_{44}$, $P_{44}P_{43}P_{42}P_{41}$ and $P_{41}P_{31}P_{21}P_{11}$. Each edge 200 is divided into an s or a t subdivision. Each of the s and t subdivisions has a beginning 202a-b and an end 204a-b. The area between a boundary edge, the start and the end of one subdivision (s, for example) and the beginning of the other subdivision (t, in this example) is called a "strip" 210. There are 4 strips: 210a-d. The area between the two edges 200 meeting at a corner, the end of one subdivision (t, for example) and the beginning of another subdivision (s, in this example) is called "corner area" 212. There are 4 corner areas: 212a-d. The four corner areas 212 plus the four strips 210 form a "frame". The area resulting after removing the frame from the surface is called the "interior parametric rectangle" 214

Figure 13:
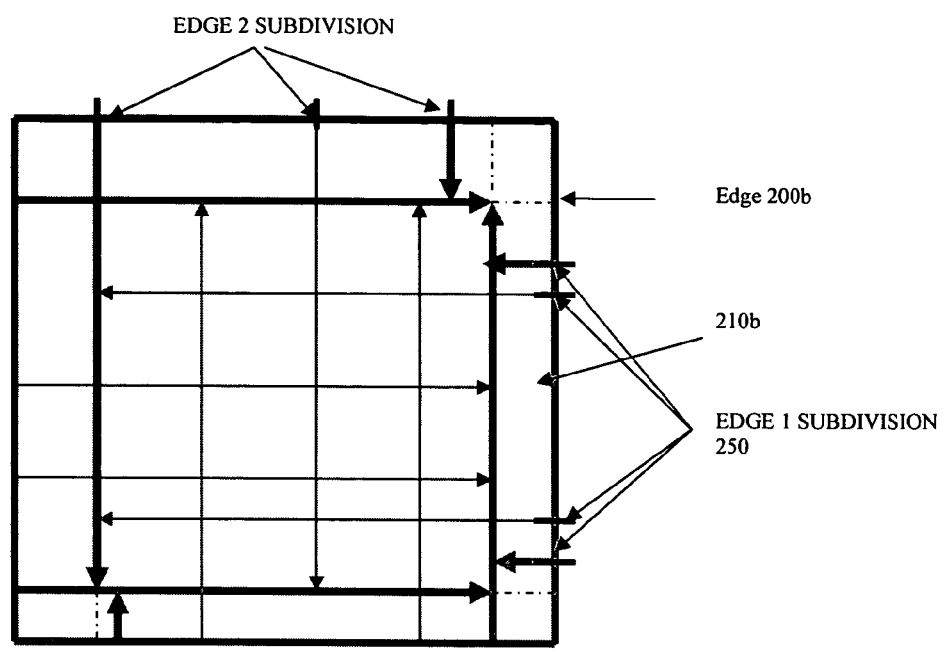
FIG. 13 shows the subdivision of one edge of the surface.

FIG. 13 shows the subdivision of one edge of the surface. The edge subdivision 250 induces a subdivision of the strip 210b abutting the edge 200b and also a subdivision of the interior rectangle. It does not induce a subdivision into the other 3 strips that do not abut the edge. Each of the 4 boundary edges 200a-d gets subdivided. In addition to the 4 boundary edges 200a-d, two of the internal curves (for example, referring to FIG. 4, the two curves are determined by the control points $P_{42}P_{32}P_{22}P_{12}$ and $P_{31}P_{32}P_{33}P_{34}$) also get subdivided. This is necessary because some of the surfaces have more internal curvature than boundary curvature.

Figure 14:
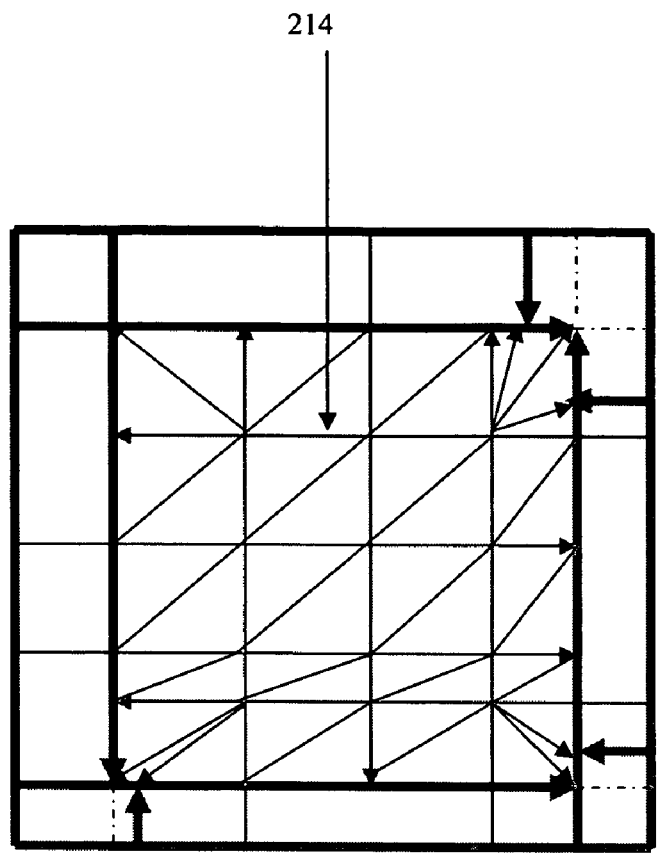
FIG. 14 shows the tesselation of the interior rectangle of the surface.

FIG. 14 shows the tesselation of the interior parametric rectangle 214 of the surface. After each edge 200 gets subdivided a subdivision of the interior parametric rectangle 214 results. In addition to the subdivision induced by the 4 edges there is also a subdivision induced by the two internal curves (for example, referring to FIG. 4, the two curves are determined by the control points P42P32P22P12 and P31P32P33P34). This subdivision results into a tesselation as seen in FIG. 14.

Figure 15:
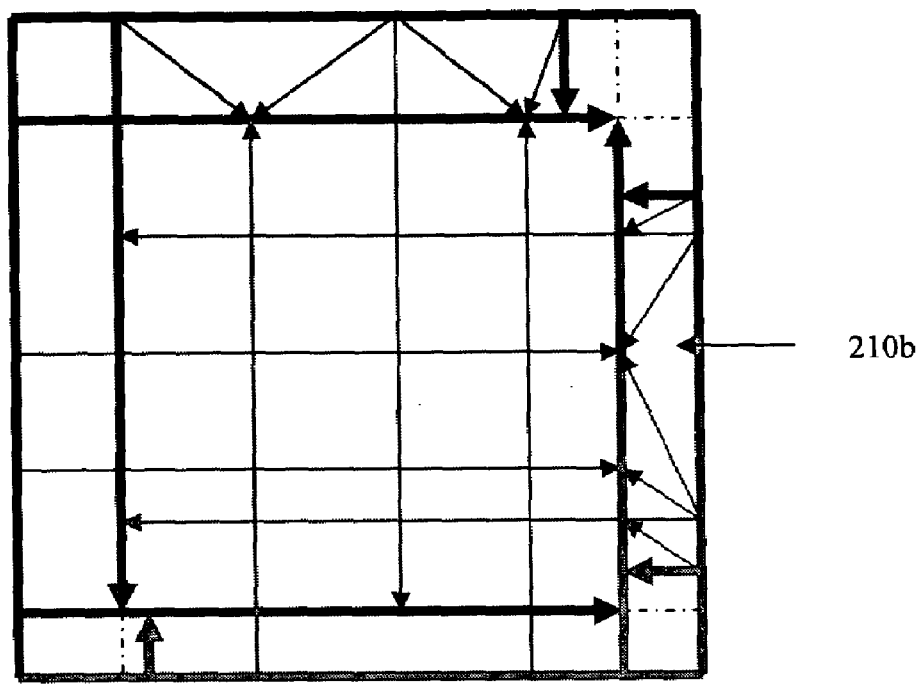
FIG. 15 shows the tesselation of one boundary strip.

FIG. 15 shows the tesselation of one boundary strip 210b

Figure 16:
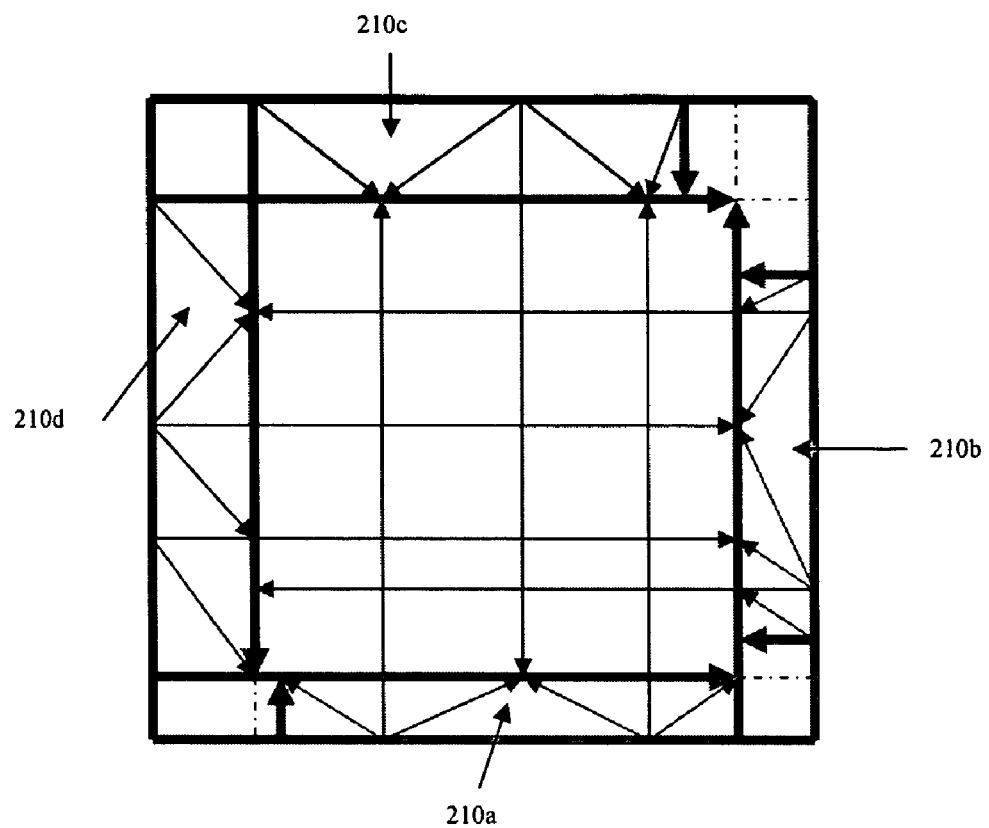
FIG. 16 shows all four boundary strips after the tessellation.

FIG. 16 shows all four boundary strips 210a-d after they have been tessellated.

Figure 17:
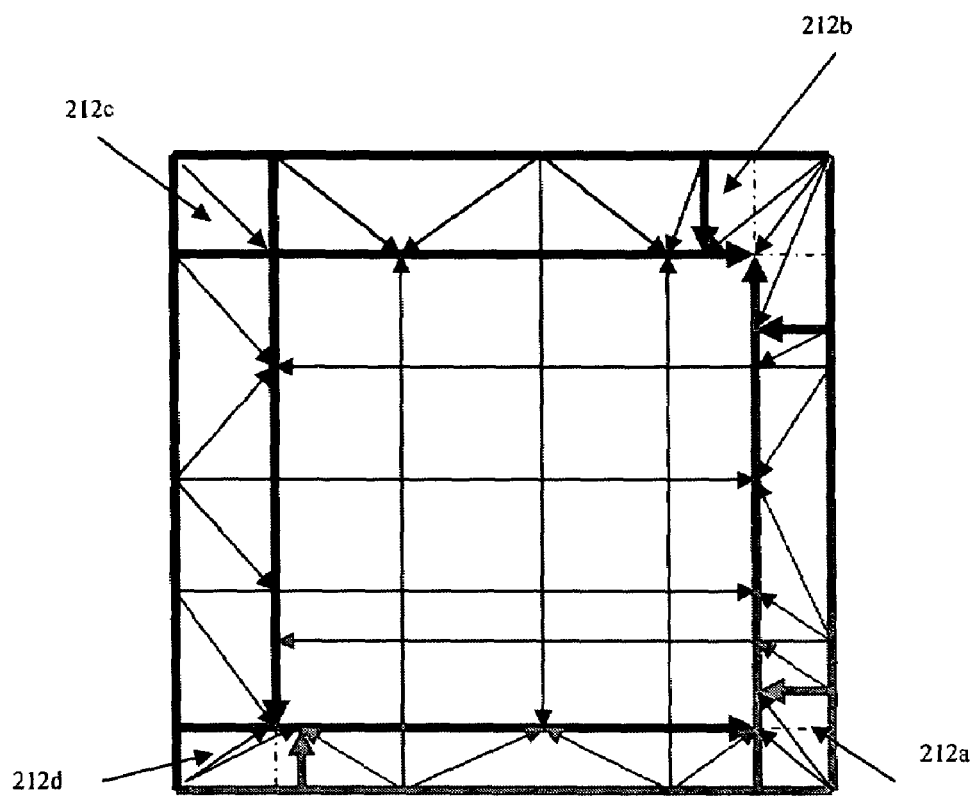
FIG. 17 is a figure that shows one implementation for corner tesselation. In this implementation triangles radiate from the corner of the surface.

FIG. 17 shows one implementation for corner tesselation. In this implementation triangles radiate from each of the 4 corners 212a-d of the surface. An example of a corner is the area between the subdivision ends 204a, 204b, 204c, the beginning of the subdivision 202d and the boundary edges 200b and 200c.

Figure 18:
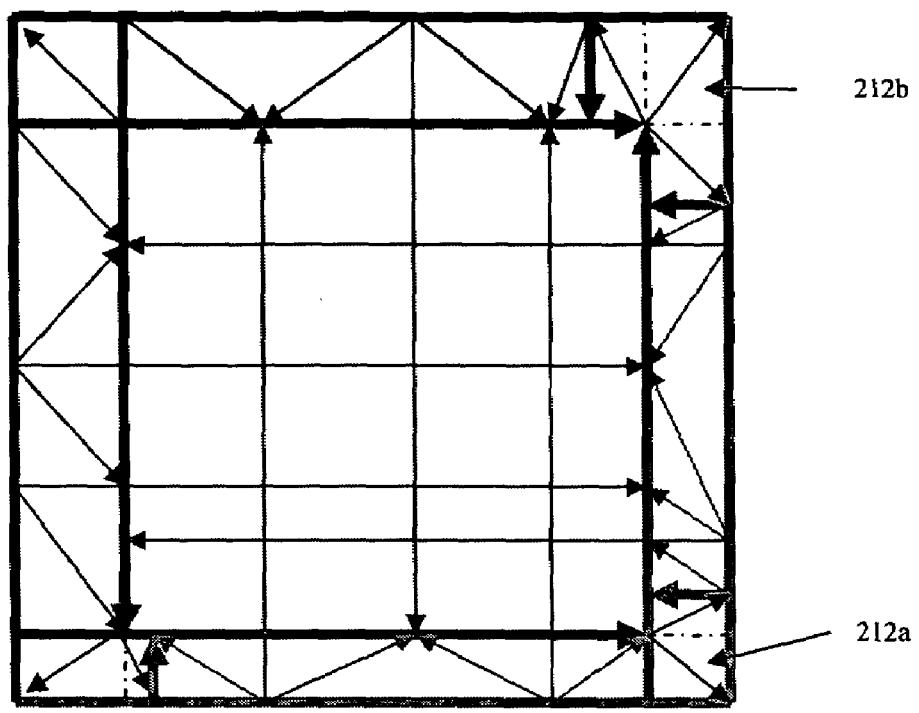
FIG. 18 is a figure that shows an improved corner tesselation in which triangles radiate from the corner of the internal rectangle, resulting into more evenly shaped triangles.

FIG. 18 shows an improved corner tesselation. In this implementation triangles radiate from each of the 4 corners of the internal parametric rectangle. The resulting triangles are more evenly shaped because the angle of the emerging triangles is larger than the case described in FIG. 17.

FIG. 19 shows that the method guarantees continuity along abutting edge 210b as well as independent tesselation of neighboring surfaces. Abutting surfaces share the same edge tesselation by virtue of sharing a common edge. As a result, the two strips on the either side of the common edge share triangle vertices along the common edge. The result is that there are no "T-joints" along the common edge 210b.

Figure 20:
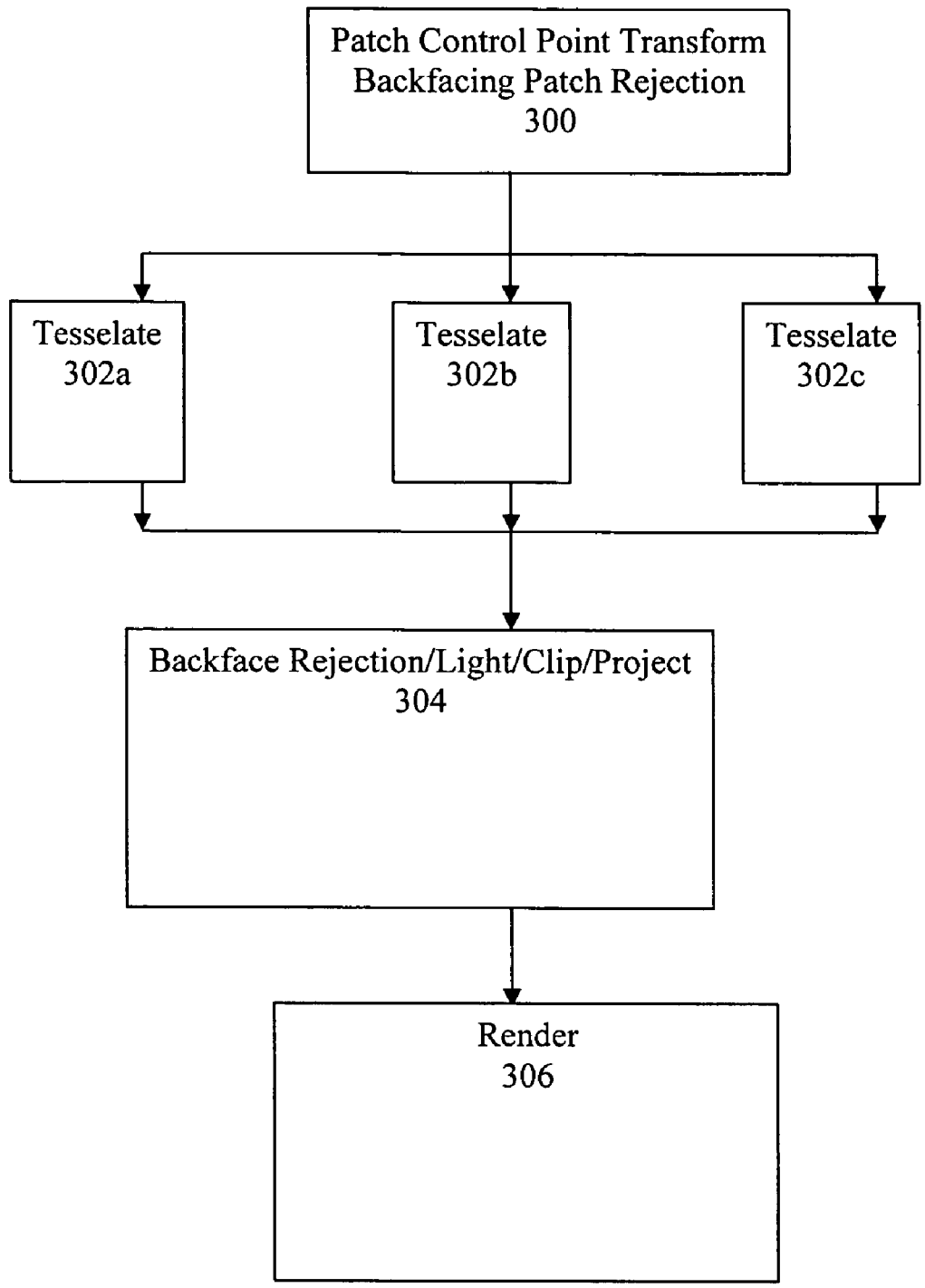
FIG. 20 shows the parallel tesselation in an array of tesselation processors.

FIG. 20 shows the parallel tesselation in an array of tesselation processors for implementing the present invention. The databases of surfaces to be tessellated can be distributed to independent tesselator processors 302a-302c. Each tesselator processor 302a-302c tessellates the surfaces distributed to it. There is no interprocessor communication because there is no data to be communicated, each surface in the database is tessellated independently. The patch control point transform and backfacing patch rejection unit 300 transforms the control points of each patch and rejects the patches that face away from the viewer. The unit 300 also distributes the remaining front facing patches to the tesellation units 302a-c. The multiple tessellation units 302a-c receive the patches from unit 300 and apply the real time tessellation method producing triangle meshes from the patches. The resultant triangle meshes are subjected to backface rejection, lighting, clipping and projection in unit 304 and to rendering in unit 306.

Figure 21:
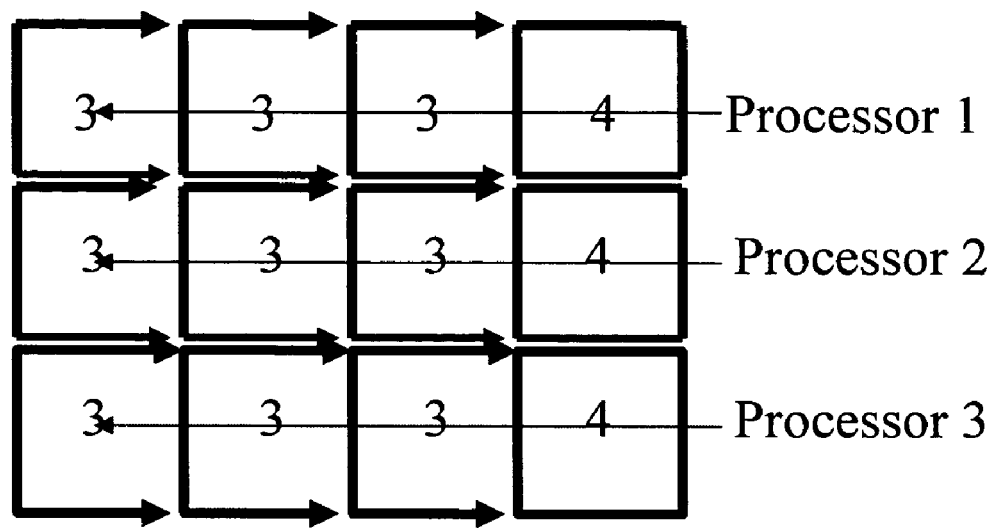
FIG. 21 shows an example of load distribution in an array of tesselation processors.

FIG. 21 shows an example of load distribution in the array of tesselation processors 302a-302c. Each tesselation processor 302a-302c works on a strip of surfaces. Note that only the first surface in the strip needs to have all 4 edges subdivided, the subsequent surfaces need to have only 3 edges subjected to subdivision because they each share an edge with previous patch.

Figure 22:
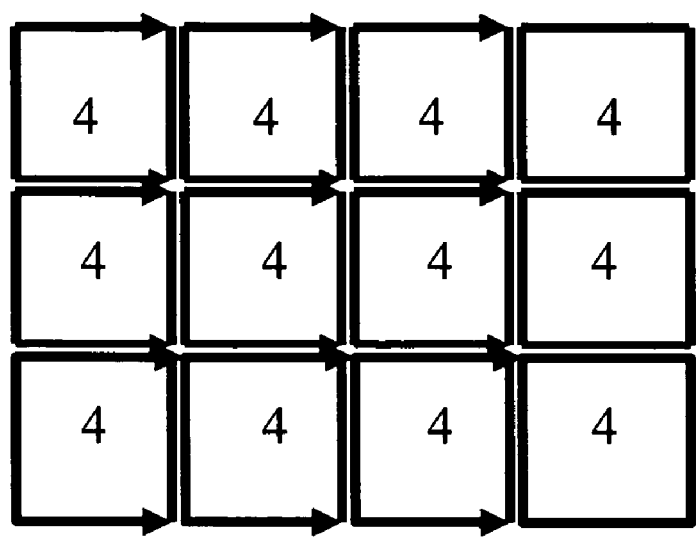
FIG. 22 shows a totally arbitrary distribution of surfaces submitted to tesselation.

FIG. 22 shows a totally arbitrary distribution of surfaces submitted to tesselation. In this approach, each of the 4 edges of each of the surfaces in the database needs to be subdivided because there is no guarantee that abutting surfaces are tessellated in order. Because the surfaces are submitted for tessellation in random order, there is no record of shared edges. This results into a small overhead of having to subdivide shared edges twice. Nevertheless, there will be no cracks since shared edges are being subdivided exactly the same way each of the two times. If there are no special prevention methods, cracks may appear at the boundary between abutting surfaces. This is mainly due to the fact that the surfaces are subdivided independently of each other. Abutting surfaces can exhibit different curvatures resulting in different subdivisions.

If two surfaces bounding two separate surfaces share an edge curve, they share the same control points and they will share the same tessellation. By doing so we ensure the absence of cracks between surfaces that belong to data structures that have been dispatched independently.

As stated above, zippering is an aspect of the present invention that leaves the interior of surfaces untouched, allowing the interior regions to be tessellated without concern for neighboring surfaces. In order to eliminate cracks between adjacent surfaces, the portion of the two surfaces that are in immediate contact with a shared edge curve, called the strip, is tessellated identically on both sides of the edge curve. The zippering is illustrated in FIG. 19. The principle of the zippering method is described in the following pseudo-code:

For each surface
   Subdivide ALL 4 boundary edges PLUS 2 internal orthogonal curves
For each of the 4 BOUNDARY EDGES
   Leave a STRIP of 1 subdivision parametric step between the boundary edge and the interior
   For each STRIP
      Zipper the STRIP WITHIN the subdivision parametric steps
   For each of the 4 CORNERS
      Tesselate the AREA not covered by the two STRIPS joining at the CORNER
   Tesselate the INTERIOR PARAMETRIC RECTANGLE The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for rendering bicubic surfaces of an object on a computer system, at least a portion of the surfaces defined by sixteen control points and bounded by four boundary curves, each corresponding to an edge, wherein each boundary edge is formed by a boundary box of line segments formed between four control points, and wherein at least one surface shares one of the boundary edges with a second surface, the method comprising:

(a) transforming only the control points of the surface given a view of the object;

(b) using the four boundary edges for purposes of subdivision;

(c) selecting an additional pair of orthogonal internal curves to process;

(d) iteratively subdividing the four boundary edges and the pair of orthogonal internal curves in screen coordinates, wherein two new curves are generated with each subdivision;

(e) performing a new subdivision on each of the four boundary edges and the two orthogonal internal curves for each new view in screen coordinates, wherein the subdivision of the four boundary curves ensures continuity along the shared boundary edge;

(f) terminating the subdivision of each of the curves when the curves satisfy a flatness threshold expressed in screen coordinates, thereby minimizing a number of computations required to render the object; and (g) storing the rendered object in a memory.

2. The method of claim 1 wherein a corner is the point where two boundary edges meet, the method further including the steps of:

for each of the 4 boundary edges,
   leaving a strip of 1 subdivision parametric step between the boundary edge and the interior;
for each strip,
   zippering the strip within the subdivision parametric steps;
for each of the 4 corners,
   tesselating an area not covered by the two strips joining at the corner; and
   tesselating an interior parametric rectangle.

3. The method of claim 2 further including the parallel tesselation of a database of surfaces by using an array of tesselation processors wherein the surfaces to be tessellated are distributed to an array of tesselator processors wherein each tesselator processor independently tessellates the surfaces distributed to it, and wherein there is no interprocessor communication because there is no data to be communicated, each surface in the database is tessellated independently.

4. The method of claim 1 further including the steps of: iteratively subdividing the segments forming the boundary box of each of the selected boundary and internal curves, creating two new boundary boxes and corresponding curves; and
terminating the subdivision when a maximum height of both the new boundary boxes reaches a predetermined threshold measured in screen coordinates.

5. The method of claim 4 further including the step of expressing the predetermined threshold as one pixel.

6. The method of claim 2 further including the step of representing the subdivision termination in screen coordinates by compensating the maximum height of the boundary box from a distance from a viewer by a projection plane division.

7. The method of claim 3 further including the step of projecting control points and the line segments comprising the boundary box defining one of the curves onto a display screen.

8. The method of claim 7 further including the step of measuring the projected distances to determine if the threshold is reached.

9. The method of claim 4 further including the step of performing the tesselation in hardware.

10. The method of claim 4 further including the step of performing the tesselation in software.

11. The method of claim 4 further including the step of performing the tesselation using a combination of hardware and software.

12. The method of claim 4 further including the step of rendering the object by generating vertices, normals and texture coordinates for the subdivision in real time by generating a new set for each surface orientation.

13. The method of claim 12 further including the step of performing the subdivision and the rendering in real-time.

14. The method of claim 12 further including the step of generating the triangles by connecting neighboring vertices.

15. The method of claim 1 further including the steps of calculating the normal Ni,j to each vertex Vi,j and, calculating the normal to each triangle.

16. The method of claim 1 further including the step of calculating lighting for each vertex Vi,j.

17. The method of claim 1 further including the steps of clipping each triangle against a viewing viewport; and calculating lighting for the vertices produced by the clipping.

18. The method of claim 1 further including the step of projecting all the vertices Vi,j into screen coordinates (SC).

19. The method of claim 1 further including the step of rendering all the triangles produced after clipping and projection.

20. A computer readable medium containing program instructions for rendering bicubic surfaces of an object on a computer system, at least a portion of the surfaces defined by sixteen control points and bounded by four boundary curves, wherein each boundary curves is formed by boundary box of line segments formed between four control points, and wherein at least one surface shares one of the boundary edges with a second surface, the program instructions for:
  (a) transforming only the control points of the surface given a view of the object;
  (b) using the four boundary edges for purposes of subdivision;
  (c) selecting an additional pair of orthogonal internal curves to process;
  (d) iteratively subdividing the four boundary edges and the pair of orthogonal internal curves in screen coordinates, wherein two new curves are generated with each subdivision;
  (e) performing a new subdivision on each of the four boundary edges and the two orthogonal internal curves for each new view in screen coordinates, wherein the subdivision of the four boundary curves ensures continuity along the shared boundary edge;
  (f) terminating the subdivision of each of the curves when the curves satisfy a flatness threshold expressed in screen coordinates, thereby minimizing a number of computations required to render the object and
  (g) storing the rendered object in a memory.

21. The computer readable medium of claim 20 wherein a corner is the point where two boundary edges meet, the method further including the steps of:
  for each of the 4 boundary edges,
    leaving a strip of 1 subdivision parametric step between the boundary edge and the interior;
  for each strip,
    zippering the strip within the subdivision parametric steps;
  for each of the 4 corners,
    tesselating an area not covered by the two strips joining at the corner; and
    tesselating an interior parametric rectangle.

22. The method of claim 21 further including the parallel tesselation of a database of surfaces by using an array of tesselation processors wherein the surfaces to be tessellated are distributed to an array of tesselator processors wherein each tesselator processor independently tessellates the surfaces distributed to it, and wherein there is no interprocessor communication because there is no data to be communicated, each surface in the database is tessellated independently.

23. The computer readable medium of claim 20 further including the instructions of:
  iteratively subdividing the segments forming the boundary box of each of the selected curves, creating two new boundary boxes and corresponding curves; and
  terminating the subdivision when a maximum height of one of the new boundary boxes reaches a predetermined threshold measured in screen coordinates.

24. The computer readable medium of claim 23 further including the instruction of expressing the predetermined threshold as one pixel.

25. The computer readable medium of claim 21 further including the instruction of representing the subdivision termination in screen coordinates by compensating the maximum height of the boundary box from a distance from a viewer by a projection plane division.

26. The computer readable medium of claim 22 further including the instruction of projecting control points and the line segments comprising the boundary box defining one of the curves onto a display screen.

27. The computer readable medium of claim 26 further including the instruction of measuring the projected distances to determine if the threshold is reached.

28. The computer readable medium of claim 23 further including the instruction of performing the subdivision in hardware.

29. The computer readable medium of claim 23 further including the instruction of performing the subdivision in software.

30. The computer readable medium of claim 23 further including the instruction of performing the subdivision using a combination of hardware and software.

31. The computer readable medium of claim 23 further including the instruction of rendering the object by generating vertices, normals and texture coordinates for the subdivision in real time by generating a new set for each surface orientation.

32. The computer readable medium of claim 31 further including the instruction of performing the subdivision and the rendering in real-time.

33. The computer readable medium of claim 31 further including the instruction of generating the triangles by connecting neighboring vertices.

34. The computer readable medium of claim 20 further including the instructions of calculating the normal Ni,j to each vertex Vi,j and, calculating the normal to each triangle.

35. The computer readable medium of claim 20 further including the instruction of calculating lighting for each vertex Vi,j.

36. The computer readable medium of claim 20 further including the instructions of clipping each triangle against a viewing viewport; and calculating lighting for the vertices produced by the clipping.

37. The computer readable medium of claim 20 further including the instruction of projecting all the vertices Vi,j into screen coordinates (SC).

38. The computer readable medium of claim 20 further including the instruction of rendering all the triangles produced after clipping and projection.

39. A computer system for rendering curved surfaces of an object, comprising:
- a communication path;
- a random access memory (RAM) coupled to the communication path containing program instructions for defining curved surfaces of an object and instructions for rendering the object, wherein at least a portion of the curved surfaces are defined by sixteen control points and bounded by four boundary curve edges, wherein each boundary curve edges is formed by boundary box of line segments formed between four control points, wherein a corner is the point where two boundary curve edges meet, wherein at least one surface shares one of the boundary edges with a second surface;
- at least one processor coupled to the communication path;
- a graphics controller coupled to the communication path for receiving commands from the processor and generating display signals therefrom; and
- a display unit coupled to the graphics controller for displaying images defined by the display signals,
- wherein when the program instructions are executed, the program instructions render the curved surfaces of the object by,
  - (a) transforming only the control points of the surface given a view of the object;
  - (b) using the four boundary edges for purposes of subdivision;
  - (c) selecting an additional pair of orthogonal internal curves to process;
  - (d) iteratively subdividing the four boundary edges and the pair of orthogonal internal curves in screen coordinates, wherein two new curves are generated with each subdivision;
  - (e) terminating the subdivision of each of the curves when the curves satisfy a flatness threshold expressed in screen coordinates, thereby minimizing a number of computations required to render the object; and
  - (f) for each of the 4 boundary edges,
    - leaving a strip of 1 subdivision parametric step between the boundary edge and the interior;
    - for each strip,
      - zippering the strip within the subdivision parametric steps;
    - for each of the 4 corners,
      - tesselating an area not covered by the two strips joining at the corner; and
      - tesselating an interior parametric rectangle.

40. The computer system of claim 39 wherein the instructions for subdivision and rendering are executed in real time.

41. The computer system of claim 39 wherein the instructions are stored in the RAM.

42. The computer system of claim 39 wherein the instructions are retrieved from a network interface.

43. The computer system of claim 39 wherein the instructions are executed by the processor.

44. The computer system of claim 39 wherein the instructions are executed by the graphics controller.

45. The computer system of claim 39 wherein the instructions for subdivision are executed by the processor and the instructions for rendering are executed by the graphics controller.

46. The computer system of claim 39 wherein the graphics controller is implemented as hardware.

47. The computer system of claim 39 wherein the graphics controller is implemented as software.

48. The computer system of claim 39 wherein the graphics controller is implemented as a combination of hardware and software.

49. A method for rendering bicubic surfaces of an object on a computer system, at least a portion of the surfaces defined by sixteen control points and bounded by four boundary curves, each corresponding to an edge, wherein each boundary edge is formed by a boundary box of line segments formed between four control points, wherein a corner is the point where two boundary edges meet and wherein at least one surface shares one of the boundary edges with a second surface, comprising:
- (a) transforming only the control points of the surface given a view of the object;
- (b) using the four boundary edges for purposes of subdivision;
- (c) selecting an additional pair of orthogonal internal curves to process;
- (d) iteratively subdividing the four boundary edges and the pair of orthogonal internal curves in screen coordinates, wherein two new curves are generated with each subdivision;
- (e) performing a new subdivision on each of the four boundary edges and the two orthogonal internal curves for each new view in screen coordinates, wherein the subdivision of the four boundary curves ensures continuity along the shared boundary edge;
- (f) terminating the subdivision of each of the curves when the curves satisfy a flatness threshold expressed in screen coordinates, thereby minimizing a number of computations required to render the object; and
- (g) for each of the 4 boundary edges,
  - leaving a strip of 1 subdivision parametric step between the boundary edge and the interior;
  - for each strip,
    - zippering the strip within the subdivision parametric steps; for each of the 4 corners,
      - tesselating an area not covered by the two strips joining at the corner; and
      - tesselating an interior parametric rectangle; and
- (h) distributing the surfaces to an array of tesselator processors wherein each of the tesselator processors independently subdivides the surfaces distributed to the respective tesselator processor as in steps (a) through (g), and wherein there is no interprocessor communication because there is no data to be communicated, such that each surface is subdivided independently.

* * * * *